US008484553B2

(12) United States Patent
Lloyd et al.

(10) Patent No.: US 8,484,553 B2
(45) Date of Patent: Jul. 9, 2013

(54) SYSTEM AND METHOD FOR DEFINING SPECIFICATIONS FOR OUTPUTTING CONTENT IN MULTIPLE FORMATS

(75) Inventors: John J. Lloyd, Ann Arbor, MI (US); David L. White, Pickney, MI (US); Paul B. Grosso, Austin, TX (US); Peter G. Bartlett, Gregory, MI (US); Robert M. Lambert, Virginia Beach, VA (US); Kenneth D. Pierce, Hampton, VA (US); Samuel S. Brow, Saline, MI (US); Joyce M. Svechota, Ann Arbor, MI (US)

(73) Assignee: Arbortext, Inc., Ann Arbor, MI (US)

( * ) Notice: Subject to any disclaimer, the term of this patent is extended or adjusted under 35 U.S.C. 154(b) by 144 days.

(21) Appl. No.: 10/839,320

(22) Filed: May 5, 2004

(65) Prior Publication Data
US 2005/0132284 A1    Jun. 16, 2005

Related U.S. Application Data

(60) Provisional application No. 60/468,126, filed on May 5, 2003.

(51) Int. Cl.
*G06F 17/00* (2006.01)
*G06F 3/00* (2006.01)

(52) U.S. Cl.
USPC ........... 715/236; 715/205; 715/234; 715/249; 715/744

(58) Field of Classification Search
USPC .............. 715/513, 522, 523, 500, 501.1, 200, 715/234–236, 238, 239, 273, 275, 760, 762, 715/204, 205, 226, 243, 249, 256, 700, 731, 715/744, 746
See application file for complete search history.

(56) References Cited

U.S. PATENT DOCUMENTS

| | | | |
|---|---|---|---|
| 5,826,025 A | 10/1998 | Gramlich | |
| 5,860,073 A * | 1/1999 | Ferrel et al. | 715/255 |
| 6,023,714 A | 2/2000 | Hill et al. | |
| 6,336,124 B1 * | 1/2002 | Alam et al. | 715/205 |
| 6,585,778 B1 * | 7/2003 | Hind et al. | 715/235 |
| 6,589,291 B1 * | 7/2003 | Boag et al. | 715/235 |

(Continued)

FOREIGN PATENT DOCUMENTS

| | | | |
|---|---|---|---|
| EP | 1071024 A2 * | 1/2001 | |
| GB | 2373085 A * | 9/2002 | |
| WO | WO 00/39666 * | 7/2000 | |

OTHER PUBLICATIONS

"XSL Transformation (XSLT) Version 2.0", W3C Working Draft, Apr. 30, 2002, pp. 1-246 (available at http://www.w3.org/TR/2002/WD-xslt20-20020430/).*

(Continued)

*Primary Examiner* — Maikhanh Nguyen
(74) *Attorney, Agent, or Firm* — Dorsey & Whitney LLP

(57) ABSTRACT

A system and method for defining specifications for outputting content to multiple formats. More specifically, a system and method for creating a single multi-purpose stylesheet file from a single user interface, the single multi-purpose stylesheet being capable of designing multiple output media formats. For example, the multi-purpose stylesheet may convert input XML content to HTML, PDF, PostScript, WML, or other output formats. The method may include creating or modifying a multipurpose stylesheet containing formatting rules corresponding to various properties of different output media formats. A user can configure the multi-purpose stylesheet by selecting different formatting properties for different output media formats.

24 Claims, 16 Drawing Sheets

U.S. PATENT DOCUMENTS

| | | | | |
|---|---|---|---|---|
| 6,822,663 | B2* | 11/2004 | Wang et al. | 715/854 |
| 6,826,597 | B1* | 11/2004 | Lonnroth et al. | 709/207 |
| 6,857,102 | B1* | 2/2005 | Bickmore et al. | 715/205 |
| 6,925,595 | B1* | 8/2005 | Whitledge et al. | 715/234 |
| 7,120,867 | B2* | 10/2006 | Breuer et al. | 715/239 |
| 7,134,073 | B1* | 11/2006 | Fiedorowicz et al. | 715/235 |
| 7,143,344 | B2* | 11/2006 | Parker et al. | 715/236 |
| 7,152,205 | B2* | 12/2006 | Day et al. | 715/239 |
| 7,200,809 | B1* | 4/2007 | Paul et al. | 715/205 |
| 7,200,816 | B2* | 4/2007 | Falk et al. | 715/762 |
| 7,251,778 | B1* | 7/2007 | Hill et al. | 715/210 |
| 7,269,788 | B2* | 9/2007 | Gharavy | 715/513 |
| 7,281,060 | B2* | 10/2007 | Hofmann et al. | 709/246 |
| 7,328,403 | B2* | 2/2008 | Ramarao et al. | 715/236 |
| 7,370,274 | B1* | 5/2008 | Stuple et al. | 715/255 |
| 7,398,472 | B2* | 7/2008 | Corrington et al. | 715/762 |
| 2001/0009016 | A1* | 7/2001 | Hofmann et al. | 709/219 |
| 2001/0011287 | A1* | 8/2001 | Goto et al. | 707/513 |
| 2001/0056460 | A1* | 12/2001 | Sahota et al. | 709/201 |
| 2002/0052895 | A1* | 5/2002 | Keating | 707/514 |
| 2002/0086661 | A1* | 7/2002 | Rouse et al. | 455/412 |
| 2002/0107985 | A1* | 8/2002 | Hwang et al. | 709/246 |
| 2002/0111972 | A1* | 8/2002 | Lynch et al. | 707/523 |
| 2002/0152244 | A1* | 10/2002 | Dean et al. | 707/530 |
| 2002/0161802 | A1* | 10/2002 | Gabrick et al. | 707/517 |
| 2002/0165881 | A1* | 11/2002 | Shelton | 707/526 |
| 2002/0194227 | A1* | 12/2002 | Day et al. | 707/523 |
| 2003/0023755 | A1* | 1/2003 | Harris et al. | 709/246 |
| 2003/0037076 | A1* | 2/2003 | Bravery et al. | 707/517 |
| 2003/0058469 | A1* | 3/2003 | Buis et al. | 358/1.15 |
| 2003/0084405 | A1* | 5/2003 | Ito et al. | 715/513 |
| 2003/0106021 | A1* | 6/2003 | Mangrola | 715/513 |
| 2003/0110297 | A1* | 6/2003 | Tabatabai et al. | 709/246 |
| 2003/0120758 | A1* | 6/2003 | Yassin et al. | 709/221 |
| 2003/0137539 | A1* | 7/2003 | Dees | 345/762 |
| 2003/0167334 | A1* | 9/2003 | Butler | 709/227 |
| 2003/0217076 | A1* | 11/2003 | Heptinstall et al. | 707/104.1 |
| 2004/0024812 | A1* | 2/2004 | Park et al. | 709/203 |
| 2004/0078760 | A1* | 4/2004 | Melhem et al. | 715/522 |
| 2004/0172484 | A1* | 9/2004 | Hafsteinsson et al. | 709/246 |
| 2004/0205571 | A1* | 10/2004 | Adler et al. | 715/513 |
| 2004/0205605 | A1* | 10/2004 | Adler et al. | 715/517 |
| 2005/0050000 | A1* | 3/2005 | Kwok et al. | 707/1 |

OTHER PUBLICATIONS

"Cascading Style Sheets", level 2, CSS2 Specification W3C Recommendation, Apr. 14, 1998, XPP-002238711, pp. 1-3.*
"Peek Into the Future of XSLT 2.0", Charles White, Mar. 4, 2003, http://www.devx.com/xml/Article/11147, pp. 1-11.*
"What's New in XSLT 2.0", Evan Lenz, XML.com, Apr. 10, 2002, pp. 1-6.*
"Wireless Application Group User Agent Profile Specification", WAG UAPROF Version Nov. 10, 1999, @ Wireless Application Protocol Forum, Ltd. 1999, 76 pgs.*
Ham et al., "Wireless-Adaption of WWW Content Over CDMA", Mobile Multimedia Communications, IEEE, Nov. 1999, pp. 368-372.*
"Arbortext 5: Putting Business Users in Control. Easing the Pain of Implementation", Arbortext, Inc. Sep. 15, 2003, XP-002308730, pp. 1-23.
Walter, M., The Seybold Report, "Arbortext 5 Leapfrogs Competitors", vol. 3, No. 4, May 26, 2003, XP-002308731.
Arbortext, "DCAM Datasheet", 4 pgs., Feb. 11, 2004, XP-002308732.
Rockley, A., "Dynamic Content Management", Intercom, Magazine of the Society for Technical Communication, Feb. 2001, pp. 28-42, XP-002308733.
Suzuki Toshimitsu et al., "XML Projects in Japan and Fujitsu's Approach to Xlink/XPointer", Fujitsu Sci Tech J., Fujitsu Scientific and Technical Journal 2000 Fujitsu Ltd., Kawasaki, Japan, vol. 36, No. 2, 2000, pp. 175-184.
Arbortext, "Epic Editor", XP-002308735, 2001.
Kirda, E., "Engineering Device-Independent Web Services", Ph.D. Thesis, Aug. 19, 2002, XP-002342353.
Pich, C., "XSLT Stylesheet Composer", Feb. 21, 2003, XP-002342354.
"Cascading Style Sheets", level 2 CSS2 Specification W3C Recommendation, Apr. 14, 1998, XPP-002238711.
Arbortext, "Epic E-Content Engine (E3) Close-up", Apr. 21, 2003, XP-002321198.
"Parameterized XSL Style Sheets", Research Disclosure, Kenneth Mason Publications, Westbourne, GB., vol. 42, No. 423, Jul. 1, 1999, XP-002212821.
"Produce Close-up Epic Editor" 2001, XP-002342355.
Schneider, D., "Formatting with FrameMaker+SGML's EDD", May 2001, XP-0002342356.
Brown, T.G., "The Use of Profiling in XML Documents. Using Profiling for Personalized Information Delivery", Document Management Solutions, Inc., Jun. 19, 2001, pp. 1-9, XP-00231199.
PCT International Search Report PCT/US2004/013885 (5 pgs.).
Corrected PCT International Search Report PCT/US2004/013848 (6 pgs.).
PCT International Search Report PCT/US2004/013848 (3 pgs.).
Office Action issued by Japanese Patent Office mailed Oct. 19, 2009 in connection with Japanese Patent Application No. 2006-514288. 9 pages.
Office Action issued by Japanese Patent Office mailed Sep. 6, 2010 in connection with Japanese Patent Application No. 2006-514277. 14 pages.
Engin Kirda, "Engineering Device-Independent Web Services", Ph.D. Thesis, Technical Univesrity of Vienna, Aug. 19, 2002. pp. 64-66.
Moriguchi et al. "A method of Generating Style Sheet for XML documents", Report of Information Processing Society of Japan, Information Processing Society of Japan. Mar. 12, 1999, vol. 99, No. 25, pp. 9 to 16.
Moto, Toshiya, Internet Programming Bible: XML final, DOS/V PWER REPORT. Japan, Impress Corp., May 1, 1999, vol. 9 No. 5, p. 347-350. 6 pages.

* cited by examiner

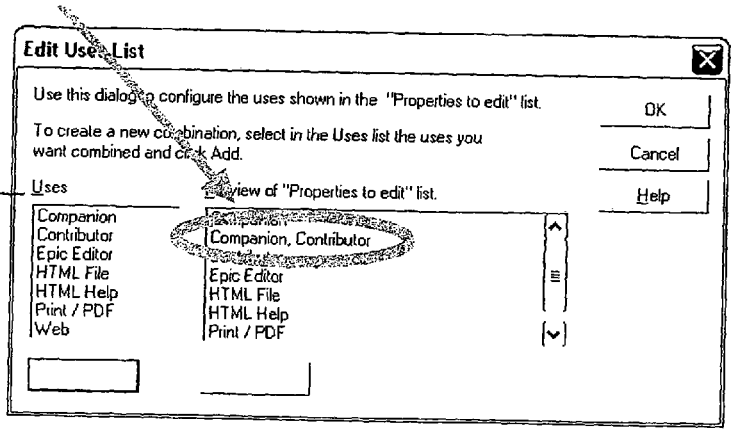

Base Classes and Stylesheet-level Classes

SYSTEM AND METHOD FOR DEFINING SPECIFICATIONS FOR OUTPUTTING CONTENT IN MULTIPLE FORMATS

FIELD OF THE INVENTION

This invention relates generally to a system for defining specifications (or stylesheets) for outputting content in multiple formats. More specifically, it relates to a system and method for defining a single specification or multi-purpose stylesheet for outputting the content to multiple output media formats.

BACKGROUND OF THE INVENTION

In today's content publishing environment, content may be generated and edited using a variety of editors, such as Microsoft Word, Web editors (e.g., Arbortext's Contributor), and Extensible Markup Language (XML) editors (e.g., Arbortext's Epic Editor). Similarly this content may be published to a variety of output media formats, including print, Portable Document Format (PDF), various forms of Hypertext Markup Language (HTML), Wireless Markup Language (WML), and PostScript. Content may also be published to compiled formats such as HTML-Help, MS Reader, formats for personal digital assistants (PDAs), and formats for mobile phones.

Currently, designers and programmers create separate stylesheets to output content with a desired layout for each desired output media format. A stylesheet typically includes information such as the font and margins, the formatting layout, and other types of information that define appearance of the outputted document. A stylesheet may be used to convert content from one format to another. For example, it may convert XML content to one of the various output media formats specified above.

Different stylesheets can be used to create different types of output for different types of devices, including differences in both content and layout. The need to perform this type of content tailoring is increasing rapidly as the popularity of new types of computing devices increases. One exemplary type is mobile devices, which typically have limited bandwidth, support fewer colors at a lower resolution and may not support audio content. Thus, XML documents originally created with the expectation that the document would be rendered on a full-function desktop computer screen or in a printed form may contain a significant amount of content that can not or should not be presented to a mobile device.

The stylesheets in the prior art are limited in that they are designed to generate output to only one specific output media format. If output to multiple formats is required, separate stylesheets must be created for each type of output. Along with the ever increasing number of display devices and display formats, there is an increasing need for a tool to automatically generate output to multiple output media formats. Thus, there is a need for a system for defining the specifications for outputting content to multiple output media formats, based on a single, multi-purpose stylesheet.

BRIEF SUMMARY OF THE INVENTION

The present invention provides a method and system for defining the specifications for and creating a single multi-purpose stylesheet file from a single user interface ("UI"), the multi-purpose stylesheet being capable of designing multiple output media formats (multichannel outputs).

Generally, the present invention provides a method and system for creating a single, multi-purpose stylesheet capable of accepting Extensible Markup Language (XML)-based content from multiple sources and outputting such content to multiple, user-configurable output media formats each with possible variations of style.

More specifically, the invention may provide a multi-purpose stylesheet and associated editor that accepts an XML input document, or other input document, and appropriately configures an output document of a user-selectable type to present the XML input document in a specific format (colloquially referred to as "rules-based formatting"). The "user-selectable type" of document may be either file-specific, such as hypertext markup language (HTML), portable document format (PDF), Microsoft WORD, or other file types, or may be device-specific, such as printer, personal digital assistant (PDA), liquid crystal display (LCD), cellular telephone, and so on. Where the user-selectable type is file-specific, the invention formats the input document for display as a computer-readable file. Where the user-selectable type is device-specific, the embodiment formats the input document for display on the specific device selected. Such formatting (either for file or device) is generally referred to as "styling." Styling is performed by applying one or more formatting rules, defined in a stylesheet, to the input.

For example, in one embodiment of the invention, an input XML document is used to prepare or modify a multi-purpose stylesheet, the multi-purpose stylesheet being useful for outputting content to multiple output media formats. The invention opens or otherwise accesses a stylesheet which includes multiple styling/formatting rules. The multi-purpose stylesheet may apply a first rule to a portion of a document for outputting as an HTML document, but a second rule (different from the first) to the same portion of the document where a WORD output file is desired. Such rules may, for example, deal with the positioning of text on a display device when the output file is opened, the color of portions of the document, which graphic (if any) is displayed within a section of the output document when viewed, or whether a specific portion of the document is included in the output file.

For example, the input file or document may include five versions of the same graphic file, or links to five external versions of the same graphic file, each graphic optimized for different viewer technology. The multi-purpose stylesheet created in accordance with the invention may choose the lowest possible resolution graphic for inclusion in an HTML output file, but select a higher resolution graphic for inclusion in a PDF or print file. Similarly, the graphic may be positioned at a certain location in the HTML file when viewed (for example, the upper left corner of the output file), but differently positioned for different output files such as PDF (for example, the middle of the output document).

A further use of the multi-purpose stylesheet is to define page length for print/PDF outputs but eliminate page lengths from HTML outputs or other outputs that do not have page length limitations. Additionally, the multi-purpose stylesheet may include optional rules-based functionality not available for all output types. HTML outputs, for example, may permit absolute positioning of text, graphics, or other objects either on a display device or within the output file, while WORD and/or PDF documents may not. The multi-purpose stylesheet may be configured to recognize such differences and apply appropriate rules to permit absolute positioning in an HTML document, but relative positioning in other output formats.

One manner in which the present invention applies formatting rules is through the identification, creation and use of "style archetypes" which further automate the outputting of content in multiple formats. Style archetypes are models or prototypes used for processing of common publishing constructs like tables of contents, indexes, bulleted or numbered lists, hyperlinks, etc. Identification of an input element as an instance of a specific style archetype may automatically apply default formatting characteristics common to the specific archetype, and may affect the use of the input element in additional output formatting applications or affect the outputs of other elements assigned to style archetypes. Each element, or group of elements, in a document may be assigned a style archetype, thereby assigning the associated formatting rules and options to the element.

Generally, the above discussion has been conducted with reference only to output file types. However, the same rules may be applied where the output is device-based. For example, with multiple graphics showing the same picture at different resolutions, an embodiment of the present invention may style output to a printer to include a higher-resolution graphic than output to a liquid crystal display (LCD) display.

Further, a multi-purpose stylesheet in accordance with the present invention may include context-specific rules. That is, a block of text may be styled differently, depending on its hierarchical location in an input document. For example, a continuous text section may be indented once when the text occurs at an XML chapter level, but indented twice (or underlined, bolded, presented in all capital letters, omitted, and so forth) when the text occurs at a sub-chapter level.

Still further, styling, in accordance with the present invention, may be user-specific in addition to output- and/or context-specific. When outputs are presented to different users, each user may be assigned a level, class, context, security clearance, or other identifier. The user identifiers may be included in the stylesheet, so that when a user of a specific class or identifier accesses an output file or otherwise operates the stylesheet, the output is differently formatted than it may be for a user of a differing class or identifier.

All of the above functionality is generally user-specifiable. In yet another embodiment of the present invention, such user specification may be accomplished through one or more graphic user interfaces (GUIs) specifically configured to simplify the creation of a multi-purpose stylesheet for a user.

Further, the present invention allows the user to extend the formatting features of the multi-purpose stylesheet through editing, for example, manually, the specification of a particular element, context or condition (explained below) for a specific output media type or device. More specifically, the software allows the user to write code, for example, Extensible Stylesheet Language (XSL) or Formatting Output Specification Instance (FOSI), for a particular output. The code is stored in a .style file. During future use of the software, the code snippets may be managed and reused. Further, a library external to the .style file may be provided which allows the code to be used in multiple stylesheets. For example, user XSL code may be edited adding custom Dynamic HTML scripting for an HTML output. This code may be used to make all part-number defining content automatically hyperlinked to a specific page of a website.

Thus, the present invention generally provides a system and method for creating a single multi-purpose stylesheet whereby using a single multi-purpose stylesheet abstraction, the baseline for formatting documents for use in publishing in multiple outputs may be defined once. Then each format or device specific output may have defined formatting that overrides the baseline formatting.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 14 is a screenshot of editing stylesheet file source code in accordance with one embodiment of the present invention.

FIG. 15 is a screenshot of assigning style characteristics to a combination of outputs in accordance with one embodiment of the present invention.

DETAILED DESCRIPTION

Figure 1:
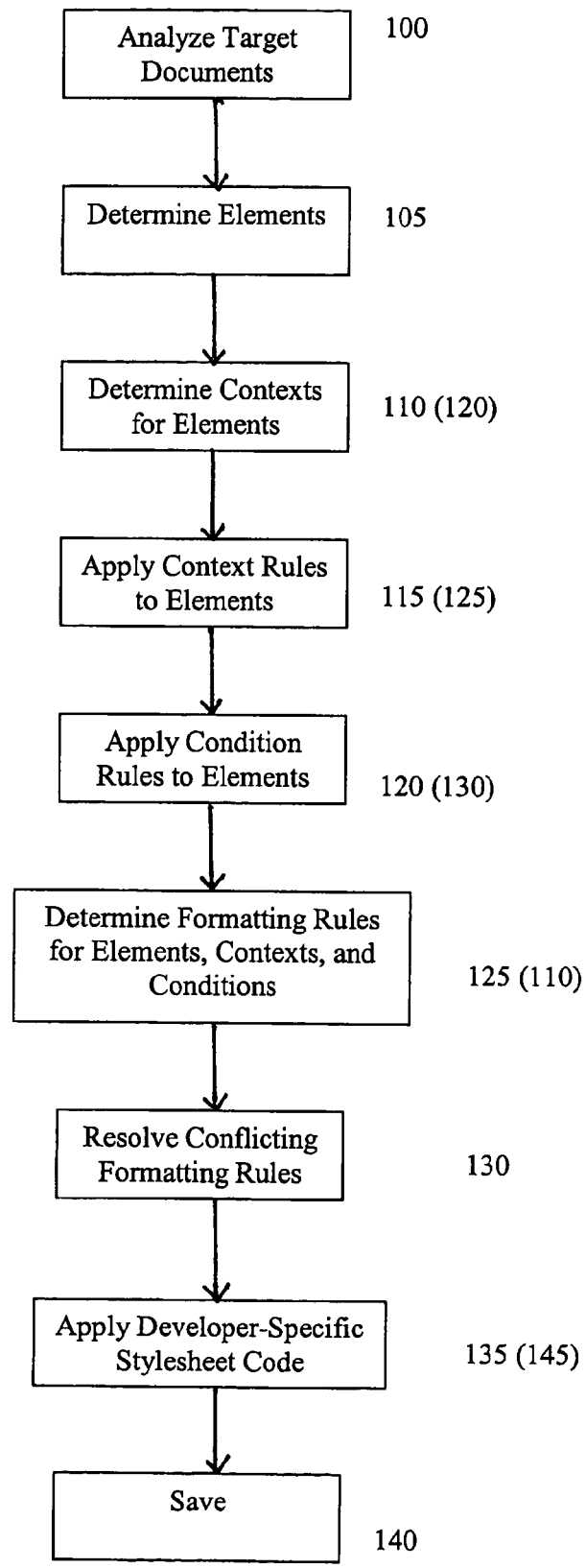
FIG. 1 is a flow chart illustrating a method for converting an input file to an output file in accordance with one embodiment of the present invention.

Generally, the present invention provides a system for defining specifications (stylesheets) for outputting content in multiple formats. More specifically, the present invention provides a system for defining a single multi-purpose stylesheet capable of accepting an input file stored in one of a variety of file formats, converting the input file to a second format using the multipurpose stylesheet and outputting the file. As such, the software of the present invention enables publishing of a document (content of which may be obtained from one or more sources) in multi-channels using a single multi-purpose stylesheet. As with the input file, the output file may be formatted as one of a variety of computer-readable file formats. The present invention provides for output- and/or context-specific styling based upon file type desired. The file type may be based upon output media format, including print, Portable Document Format (PDF), Hypertext Markup Language (HTML), Wireless Markup Language (WML), PostScript, etc. or may be based upon the output device. Exemplary output devices for use with an embodiment of the present invention include monitors, printers, televisions, liquid crystal display (LCD) screens, web tablets, cell phone displays, pagers, or any other devices capable of receiving a transmission (either wired or wireless) and displaying an alphanumeric or graphical output.

In addition to output- and/or context-specific styling, the present invention may be used for user-specific styling. Thus, when outputs are presented to different users, each user may be assigned a level, class, context, security clearance, or other identifier. The user identifiers may be included in the multi-purpose stylesheet so that when a user of a specific class or identifier accesses an output file or otherwise operates the multi-purpose stylesheet, the output is differently formatted than it may be for a user of a differing class or identifier.

Using the system and method of the present invention, it is not necessary to individually "style" or format all documents that use a same set of elements. Using a multi-purpose stylesheet of the present invention, all documents of the "document type" are formatted without any manual intervention.

To style an input file, formatting rules are applied to the file or portions thereof. Exactly which formatting rules are applied to a given document portion (or "element") is discussed in more detail with respect to FIG. 1. Generally, a "formatting rule" is a computer-executable instruction or specification indicating a certain output format, placement, font, graphic, and so forth to be applied to an element. In other words, a formatting rule controls and/or modifies the display of an element. Alternately, a formatting rule may define the interactions a user could engage such as a hyperlink or start/stop of animation.

One manner in which the present invention applies formatting rules is through the identification, creation and use of "style archetypes" which further automate the outputting of content in multiple formats. Style archetypes may be used to affect the formatting and usage of element style assignments. Style archetypes capture the purpose of a particular element with regard to how it can be formatted in the document. Each style archetype determines process behavior in other areas of the stylesheet. Style archetypes are models or prototypes used for processing of common publishing constructs like tables of contents, indexes, bulleted or numbered lists, hyperlinks, etc. Identification of an input element as an instance of a specific style archetype may automatically apply default formatting characteristics common to the specific archetype, and may affect the use of the input element in additional output formatting applications or affect the outputs of other elements assigned to style archetypes. Each element, or group of elements, in a document may be assigned a style archetype, thereby assigning the associated formatting rules and options to the element.

FIG. 1 is a flowchart illustrating an exemplary process for styling an input file of a first format to a group of differing output files of a second format. In the present embodiment, input files in accordance with the Extensible Markup Language (XML) are accepted as input files. Generally, XML provides a useful, human and machine readable, standardized syntax for representing content, metadata, links, queries, transforms, and configuration information, which permits simplified processing of dynamic content. Document content (prose) can be created as XML natively, or transformed from proprietary applications to XML. Data from a variety of software applications including directly from many databases is accessible as XML. W3C Standards such as XML Linking Language (Xlink), XML Path Language (XPath), and Extensible Stylesheet Language (XSL) can be leveraged to enable application programmers and users with a standard, application interchangeable syntax.

Input files of another file type (e.g., WORD, PDF, HTML, and so on) may be converted to an XML file prior to the styling process explained herein. Although embodiments shown employ a separate computer-readable program or module to implement this conversion (such as Arbortext's Interchange), such a conversion process may be performed by a further embodiment of the present invention. In further embodiments, file types other than XML may be natively accepted as input files.

As herein described, the present invention creates a multi-purpose stylesheet. In an exemplary embodiment, the invention creates an XML stylesheet, called a ".style" file. Optionally, the invention may generate from that .style file a standards compliant XSL or XSL Formatting Objects (XSL-FO) stylesheet file. XSL stylesheets include template rules, which define an input pattern and a template to use in creating an output result. When applying a stylesheet, the patterns in the templates are matched against the syntax of the XML source document. When a match is found with the template pattern, an output document fragment is created according to the actions specified in the template. The source document is parsed recursively, until no more matching patterns are found. The resulting document fragments are then aggregated to yield a complete output document. Of course other types of stylesheets may be created in accordance with the present invention.

Generally, a style is associated with an element of the document. Context refers to the location (or "element selector") of the element within the input file Some elements use different properties depending on the context in which the element occurs. Thus, the present invention generally associates formatting properties with the element context or with the element directly. Further, "conditions" may be used to associate different formatting properties with the same context. A condition comprises a set of attribute tests, plus a collection of formatting properties.

Referring to FIG. 1, the styling process of the present invention begins in operation 100, where target documents are analyzed. One or more input files (or "documents") may be analyzed either by the invention or by a user of the invention to create a Document Type Definition (DTD) or XML schema having tags labeling each element.

Figure 2:
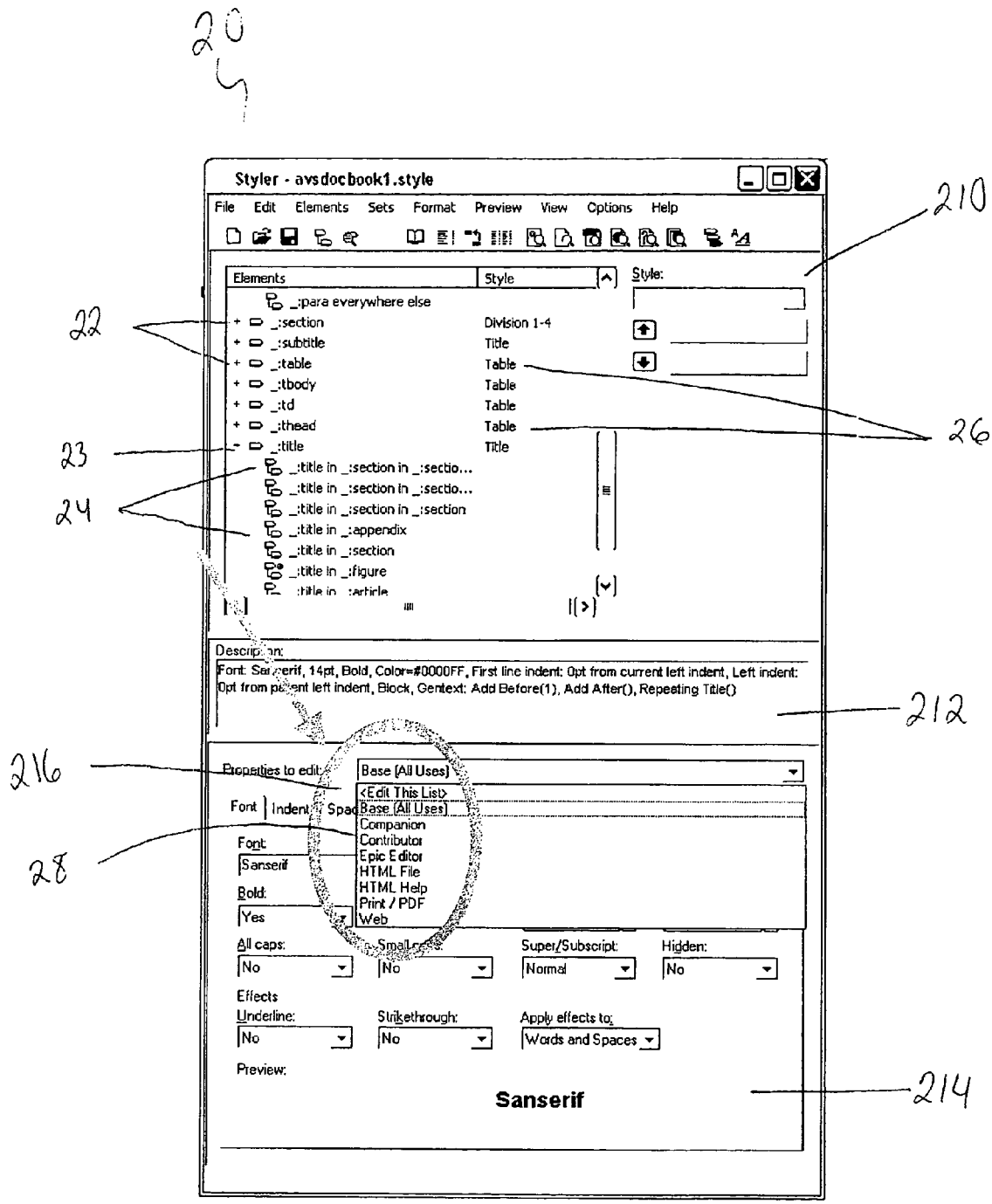
FIG. 2 is a screenshot of a user interface of an editor in accordance with one embodiment of the present invention.

FIG. 2 is a screen shot of a user interface 20 showing element tags 22, context tags 24, style tags 26, and output-based style editors 28. In operation 105 of FIG. 1, the invention determines the location and type of each element in the input file. Generally, an "element" is a portion of a document corresponding to a specific file marker, tag, or header. The tags used to define elements are generally part of the input file, and may be either automatically generated as part of the input file or manually entered. Element tags are assigned to each "element" in the input. For example, as seen in FIG. 2, the elements may be tagged "section," "subtitle," "table," "title," etc. Any suitable tag may be used and those listed and/or shown are intended to be illustrative only. XML input documents have tags natively assigned. If the input document is not an XML document, tags should otherwise be assigned. Once the appropriate file tags have been recognized and the file parsed into individual elements, each element is assigned to a specific element category. Again generally, these elements correspond to various XML elements.

After the elements have been identified and assigned, the invention determines the specific formatting rules associated with each element in operation 125 of FIG. 1. An "element" may be thought of as a portion of a document having a set of formatting properties. The formatting properties associated with the element depend on the context and/or condition associated with the element. Thus, before the specific formatting rules associated with the element can be determined, the invention determines the contexts and conditions of the elements and applies the associated context and condition rules, seen at operations 110, 115, and 120 of FIG. 1. Contexts, conditions and rules associated with contexts and conditions are described more fully below.

Each element of a specific type generally has identical formatting properties, although such properties may change in different contexts, as discussed in more detail below. For example, a block of text identified as a "para" element may have simple formatting rules, such as "always indent one tab space; hard paragraph return at end of element; 12 point Times New Roman font;" and so on. The formatting rules define how the element will be displayed, absent any more specific formatting rules that may later be applied.

Figure 3:
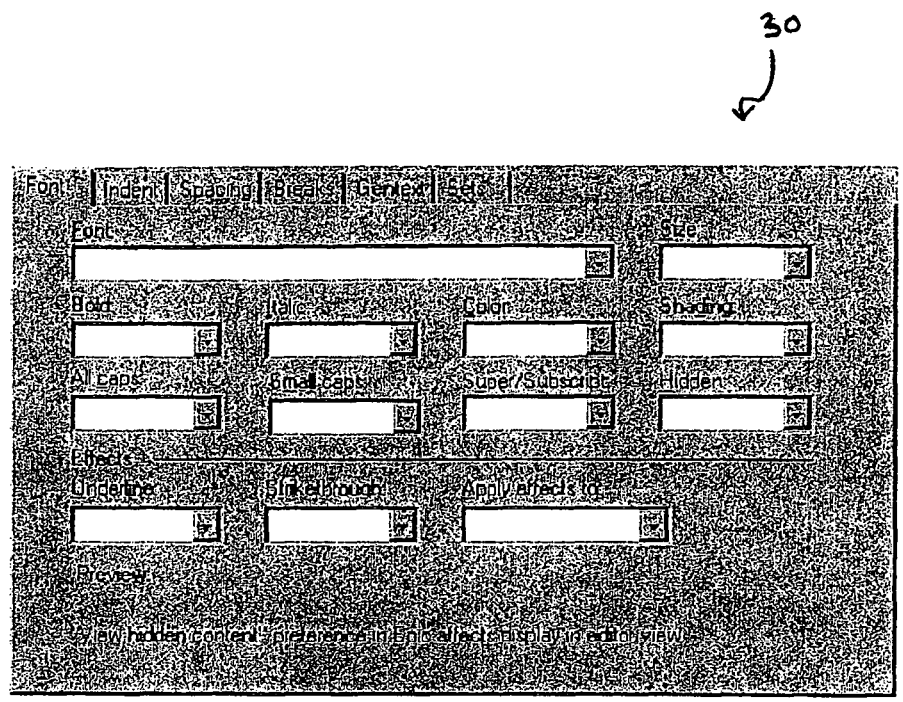
FIG. 3 is a screenshot of a font dialog box for editing font properties in accordance with one embodiment of the present invention.
Figure 4:
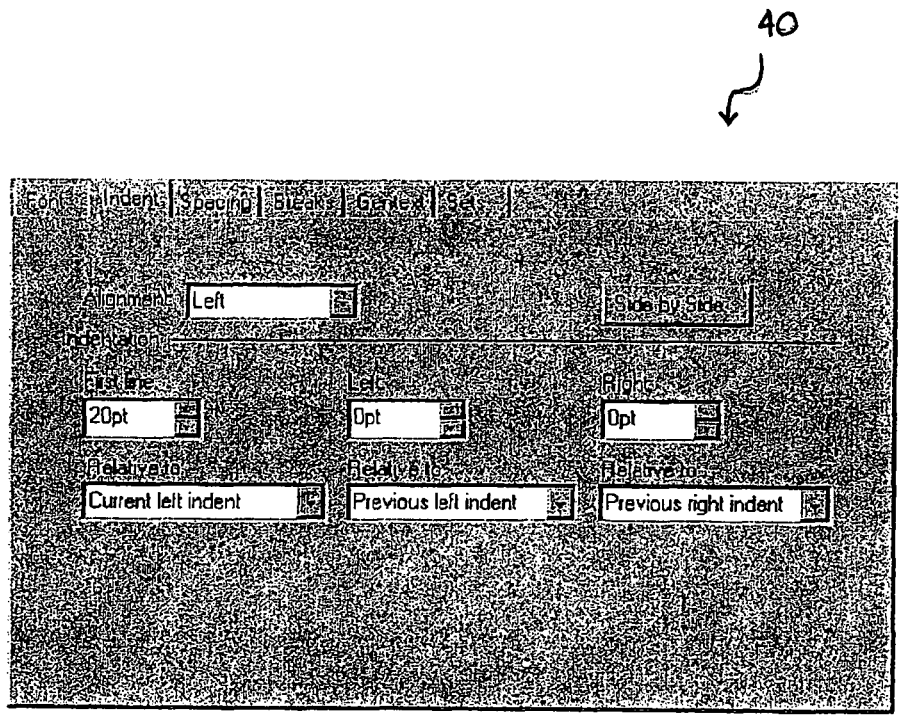
FIG. 4 is a screenshot of an indent dialog box for editing indent properties in accordance with one embodiment of the present invention.
Figure 5:
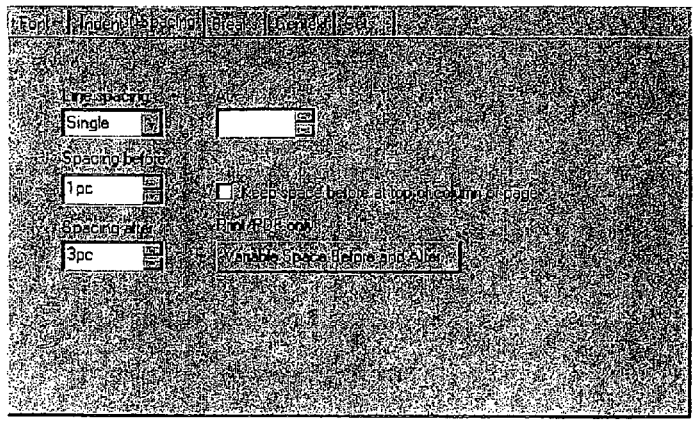
FIG. 5 is a screenshot of a spacing dialog box for editing spacing properties in accordance with one embodiment of the present invention.
Figure 6:
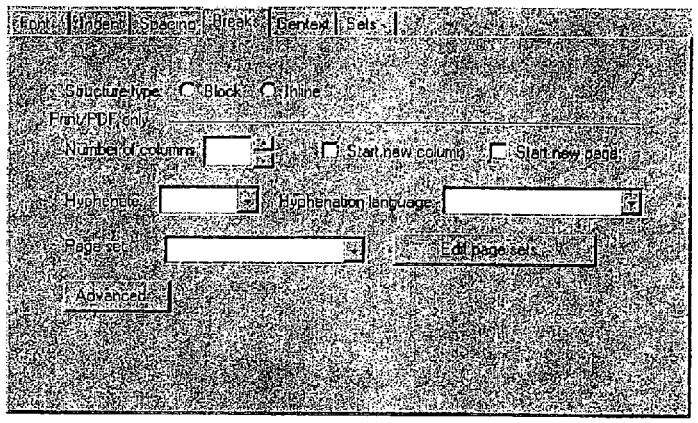
FIG. 6 is a screenshot of a breaks dialog box for editing breaks properties in accordance with one embodiment of the present invention.
Figure 7:
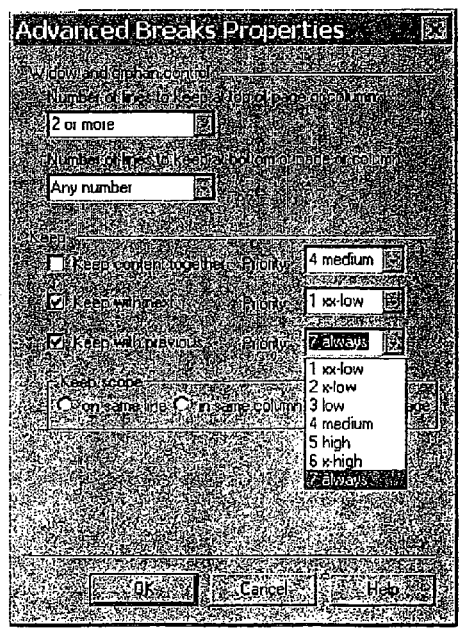
FIG. 7 is a screenshot of an advanced breaks properties dialog box accessible through the breaks dialog box of FIG. 6 for editing advanced breaks properties in accordance with one embodiment of the present invention.
Figure 8:
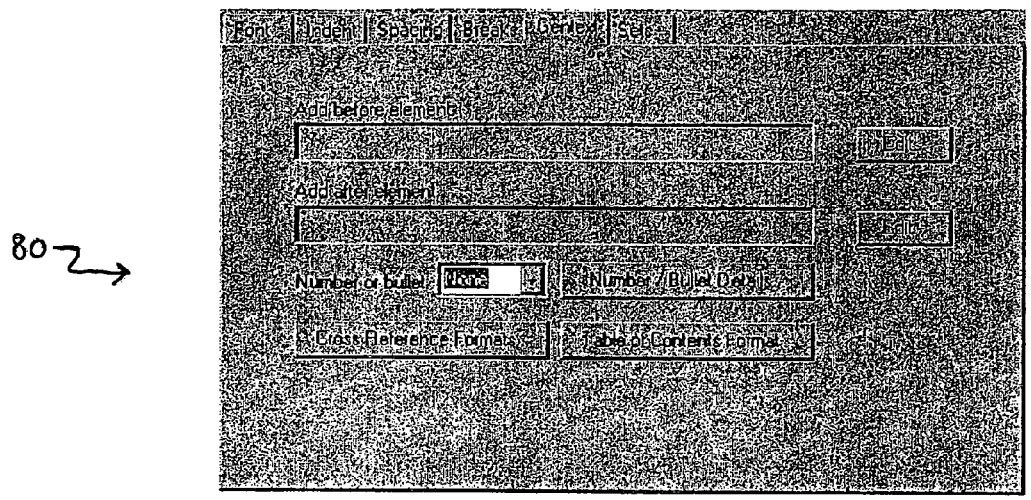
FIG. 8 is a screenshot of a gentext dialog box for editing gentext properties in accordance with one embodiment of the present invention.

FIGS. 3 through 11 are screenshots illustrating properties which may be formatted. FIG. 3 shows a font dialog box 30 for editing font properties such as font, size, bold, italic, color, shading, all caps, small caps, super/subscript, underline, strikethrough, etc. FIG. 4 shows an indent dialog box 40 for editing indent properties such as alignment, first line indent, left, right, etc. FIG. 5 shows a spacing dialog box 50 for editing spacing properties such as line spacing, spacing before, spacing after, etc. FIG. 6 shows a breaks dialog box 60 for editing breaks properties such as structure type, columns, hyphenation, etc. FIG. 7 shows an advanced breaks properties dialog box 70 accessible through the breaks dialog box 60 of FIG. 6 for editing advanced breaks properties such as the number of lines to keep at the top of a page, the number of lines to keep at the bottom of the page, keep content together, etc. FIG. 8 shows a gentext (automatically generated text) dialog box 80 for editing gentext properties such as text to be added before an element, text to be added after an element, etc.

Figure 9:
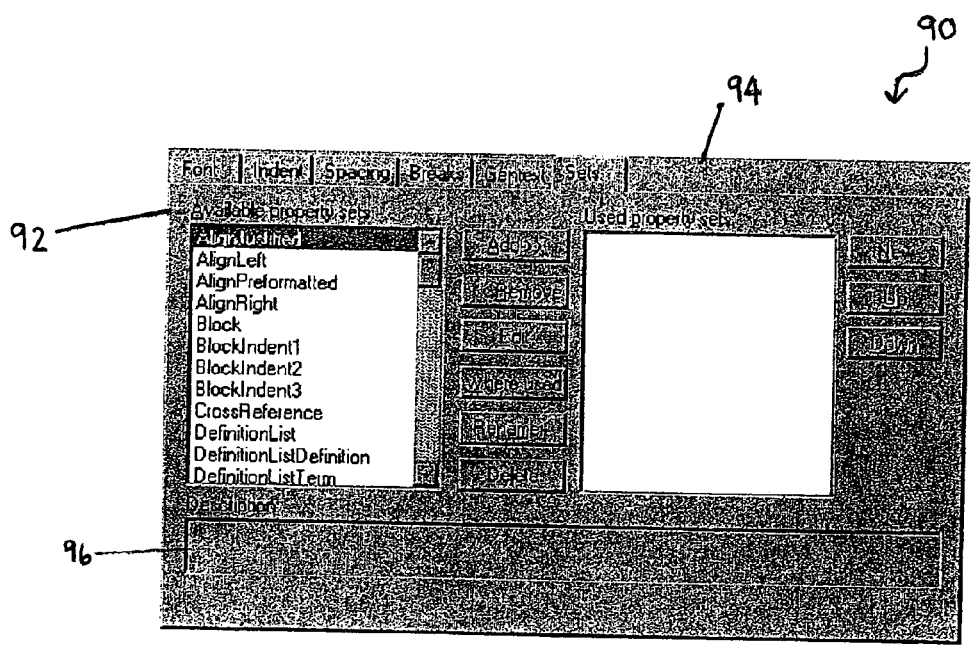
FIG. 9 is a screenshot of a sets dialog box for viewing sets in accordance with one embodiment of the present invention.
Figure 10:
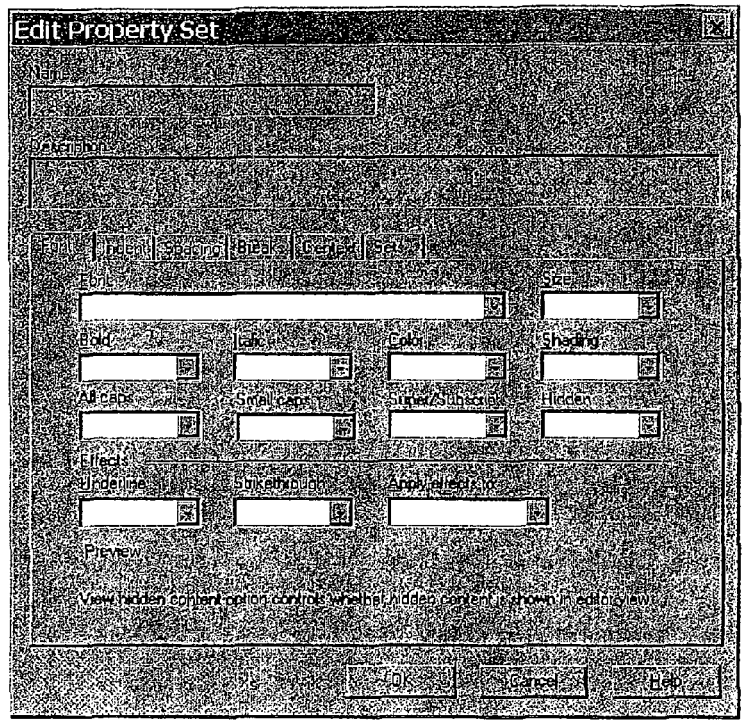
FIG. 10 is a screenshot of an edit property set dialog box for editing a property set in accordance with one embodiment of the present invention.
Figure 11:
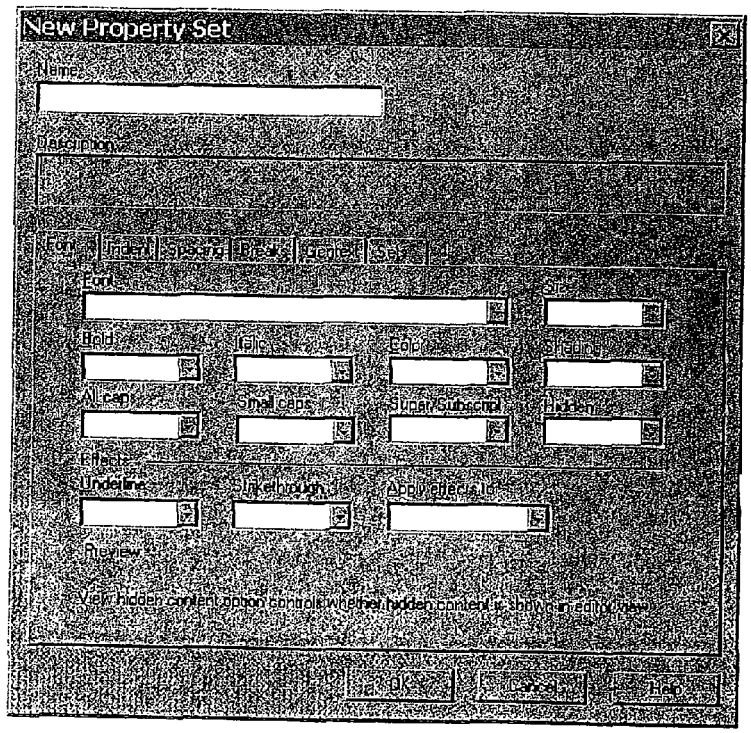
FIG. 11 is a screenshot of a new property set dialog box for adding a new property set in accordance with one embodiment of the present invention.

FIG. 9 shows a sets dialog box 90 that shows the property sets in the multi-purpose stylesheet (Available property sets 92) and the property sets referenced by the current object(s) (Used property sets 94). The Description field 96 displays the description of the selected property sets. FIG. 10 shows a dialog box 150 for editing a property set. FIG. 11 shows a dialog 160 box for adding a new property set.

The process of the present invention provides using style archetypes for generating user interface changes/behavior. Identification, creation and use of style archetypes further automates the outputting of content in multiple formats. Each style archetype determines process behavior in other areas of the stylesheet. Within the stylesheet, style archetypes, having a defined set of formatting rules, are assigned to each element, based on the tag. For example, as seen in FIG. 2, the style archetype assigned may be "Title," "Table," etc. Usage of the style archetype assignments affects the formatting and usage of other element style assignments. Style archetypes are models or prototypes used for processing of common publishing constructs like tables of contents, indexes, bulleted or numbered lists, hyperlinks, etc. Identification of an input element as an instance of a specific style archetype may automatically apply default formatting characteristics common to the specific archetype, and may affect the use of the input element in additional output formatting applications or affect the outputs of other elements assigned to style archetypes.

Figure 12:
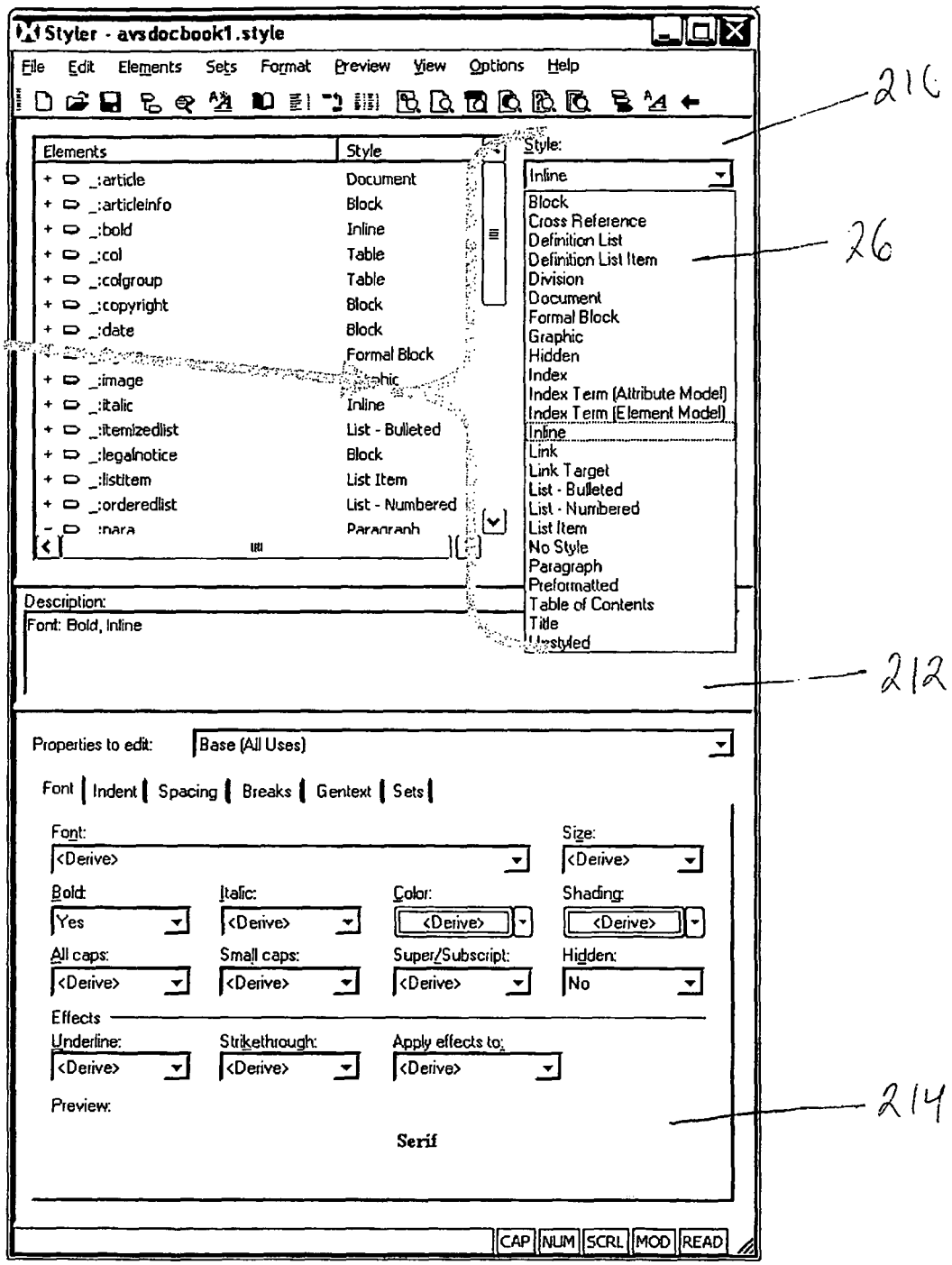
FIG. 12 is a screenshot of a user interface showing style archetype options of an editor in accordance with one embodiment of the present invention.

As seen in FIG. 12, associated with each style archetype 26 are formatting options such as font, indent, spacing, breaks, gentext, and sets. Of course, other formatting options may be associated with each style archetype. As discussed in relation to FIG. 2, each element is assigned a style archetype, thereby assigning the associated formatting rules and options to the element. Using an example of three input elements: identifying an input element as a Division applies default formatting of a forced line or page break before the start of the Division and after the end of the Division; identifying another element as a Title archetype applies line breaks, and font bolding; identifying a third element as a Table of Contents archetype applies basic outline formatting and may automatically or at user choice allow for the inclusion or exclusion of the Titles of Divisions as entries in the output of the Table of Contents. Once style archetypes have been defined, they can be modified or extended to create specialized behaviors for different users or different output media. A conventional-looking table of contents in a printed document, for example, might be represented in a completely different form on a Web browser or a PDA. Style archetypes capture the purpose of a particular element with regard to how it is formatted in a document. For example, Titles in Divisions and Formal Blocks may be identified as having specific formatting in the location in a document but may also appear in Table of Contents, List of Figures, or List of Tables. Each element, or group of elements, in a document may be assigned a style archetype, thereby assigning the associated formatting rules and options to the element.

The assigned style characteristic may be based on the output. A baseline characteristic is assigned to all outputs unless an output specific override assigns a specific characteristic. The output specific overrides may be editing specific (e.g., Epic Editor, Contributor (web editing), or Companion (Word 2003 editing)). Alternately, the output specific overrides may be publishing specific (e.g., HTML file (flat file), HTML Help (MS help Compiler), Web (folder of many HTML files, index and TOC), or Print/PDF). The formatting rules for an element may not be associated directly with the element, but instead with the element context, as discussed in more detail below. In addition, each element, may have a "default context." This default context is the same for each element, and contains the base formatting rules for the element.

Further, style characteristics may be assigned to a single output target or to a combination of outputs. FIG. 15 illustrates a screen shot of an Edit Uses/Outputs List dialog box 180 for creating a combination of outputs for assigning a style characteristic. As shown, the combination of outputs is Companion and Contributor. This enables the same style characteristic to be assigned to an element whether the output is ultimately Companion or Contributor. Of course, any combination of outputs may be selected. This capability allows users to combine outputs whose properties are generally the same. When outputs are combined, they can later be separated so changes can be made specific to one output. While they are combined, changes that are made are made to each output. Further, users may define their own outputs and add the output to the outputs list 182.

In the example embodiment, each element is always assigned to a style. Generally, an element may be mapped to only a single style, although alternative embodiments may permit mapping an element to multiple styles. In such an embodiment, potentially conflicting formatting rules may arise. Such conflicts may be resolved (at operation 130 of FIG. 1, discussed in more detail below) by applying the most specific set of style rules, by determining the most appropriate style rules based on the element context, or by applying user-implemented criteria designed to resolve formatting rules conflicts.

As previously mentioned, a user may modify formatting rules associated with a given style. When a user modifies a style's formatting rules, all elements associated with that style are appropriately updated.

Returning to FIG. 1, in operation 10, the invention determines the various contexts in which each element will appear in an output. Context is defined by the combination of an element selector and the formatting properties used for elements that match the aforementioned selector. Alternatively, "context" may refer to the element selector alone. Contexts generally correspond closely with templates in XSL Stylesheets and elements-in-context in Formatting Output Specification Instance (FOSI) stylesheets.

Formatting rules are generally associated with contexts, rather than elements, in order to ensure that the proper formatting ruleset for a given context is applied to an element without conflicting with any element-specific formatting rules. The context varies depending on the location of the element within the input file (the "element selector.") Generally, with reference to an XML input file, elements may be nested in sub-elements. For example, a "title" element may be located within a "book" element, a "chapter" element, an "abstract" element, or a "figure" element, among others. Each of these combinations is a different element selector for the title element, and accordingly each may have a different set of formatting rules.

Referring to FIG. 2, the element "title" can be seen at position 23. Listed below the title element 23 are each of the contexts 24 for that element, including, for example, "title in section," "title in appendix," "title in figure," "title in article," etc. Selecting the element title will select title in each of the contexts appearing thereunder and any properties applied will be applied to title in every context. Selecting one of the contexts, however, will allow properties to be applied only to title in that context.

Once the context of the element is determined, in operation 115 of FIG. 1, the stylesheet applies these context-specific formatting rules to each element. Thus, depending on the context of the title element, the style in which the title is displayed may vary. For example, the title element in a book context may display in 24 point font, centered, while the title element in a figure context may display in bold, blue text with a 10 point font and right justified. Accordingly, the context rules applied to the element are determined on a context-by-context basis.

When multiple contexts may apply to a single element, only the most specific context formatting rules will be applied. Thus, at operation 130 of FIG. 1, formatting rules are resolved. To return to the above example, a title element within an abstract element, which is in turn located in a book element, has two valid contexts: "title in abstract" and "title in book." (It should be noted that the contexts given are illustrative only.) The title element is nested immediately within the abstract. By contrast, although the title is located within the book, there is at least one intervening element, namely the abstract. Accordingly, in this example, the "title in abstract" formatting rules are more specific, and will be applied. The "title in book" formatting rules will not be applied.

Thus, in accordance with the present invention, formatting properties are specified for elements. An element may have just one collection of formatting properties that applies to all occurrences of the element in each document or an element may specify different properties for different contexts. Only one context is used for a given occurrence of an element.

In a specific embodiment, contexts are mapped to eics in FOSIs. Contexts are generally built such that they can be translated to FOSIs as standard eics using context and occur attributes. In XSL, contexts are implemented as XSL:template element match attributes. Output specific properties are handled by Styler emitting different XSL for different options.

In some situations it may be desirable to have different formatting properties used for the same context, based on attribute tests. For this purpose, the present invention permits associating "conditions" with a context. A condition comprises a set of attributes tests, plus a collection of formatting properties. If all of the tests are true (or a specified set of tests is true), the properties are overlaid on the properties specified for the context.

In operation 120 of FIG. 1, the embodiment applies condition-based formatting rules to an element. A "condition," as used herein, refers to at least one attribute test plus at least one formatting rule. As explained above, if the attribute test is met, then the formatting rule is applied.

Figure 16:
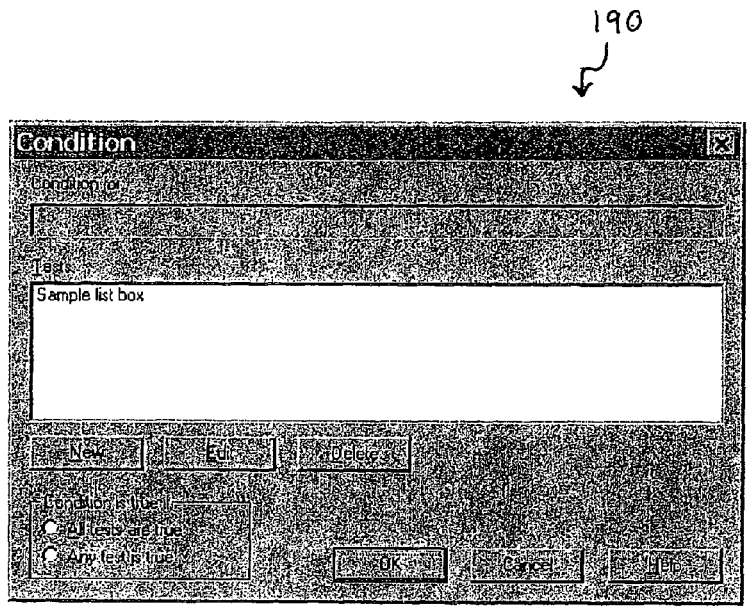
FIG. 16 is a screenshot of a condition dialog box in accordance with one embodiment of the present invention.

FIG. 16 is a screenshot illustrating a dialog box 190 for creating a new condition. The Condition dialog box 190 shown may be launched under the Elements->New Condition menu item or in the context menu in the element list. FIG. 16 illustrates the dialog box 190 that appears when a user clicks new or selects a test and clicks to edit.

Figure 17:
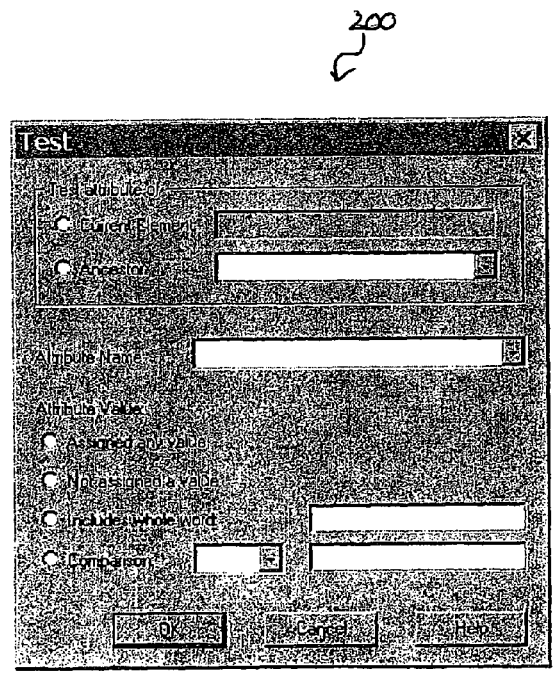
FIG. 17 is a screenshot of an attribute test for a new condition in accordance with one embodiment of the present invention.

There are two parts to a condition, the tests that determine whether a condition is true and the formatting properties that are overlaid on the context's formatting properties when the condition is true. Attribute tests may be added to the multipurpose stylesheet by the user. FIG. 17 is a screenshot of a dialog box 200 for assigning an attribute test for a new condition. A single condition may have multiple attribute tests associated therewith. In such a case, a user may specify when creating the condition whether all attribute tests must be met to apply the associated formatting rule or rules, or whether only a single test must be met. In Boolean terms, the user may specify whether the attribute test is an "AND" or "OR" style test.

Conditions apply to all outputs. However, a user can specify output specific formatting properties to be applied when a condition is true. For example, the user may add a condition to test an attribute and, in the formatting properties for the condition, select a specific output (e.g., HTML file) in the Properties to edit list, then specify the properties to be overlaid. Such a condition will only affect the selected output. Similarly, the user may add a condition to test an attribute and, in the formatting properties for the condition, make different settings for different outputs.

Generally, conditions vary from contexts. Unlike contexts, multiple condition formatting rules may be applied to a single element. If an element has multiple applicable conditions, formatting rules for each condition met are applied to the element. A user may specify an order for condition tests—a first condition may be initially checked, then a second condition, and so on.

Even though multiple conditions may apply formatting rules to a single element, it may happen that two or more conditions may attempt to apply mutually contradictory formatting rules. If formatting rules for different applied conditions conflict, later conditions in the user-specified order overrides conflicting formatting rules for earlier conditions in the order. Alternately, the invention randomly selects which formatting rules to apply. Again, at operation 130 of FIG. 1, conflicting formatting rules are resolved.

Although more specific context formatting rules override less specific context formatting rules, the same is not necessarily true of class- or output-based rules. For example, an input file styled to an output file for a specific display device, in a specific file format, to be viewed by a user of a specific class, may have all three sets of output formatting rules applied (namely, class-, output-, and file-formatting rules.) In the event that various types of formatting rules (i.e., class-, output-, and/or file-formatting rules) conflict with one another, a user may resolve such conflicts during stylesheet creation. Alternatively, the invention may choose one ruleset as the dominant formatting ruleset. In such a case, the user may be presented with a prompt or warning indicating the choice.

Using contexts and conditions, the user can specify precise "rule-based formatting" that produces the desired appearance in printed and web pages, as well as in Epic editor for whole classes of documents. Property sets may be used to simplify maintenance of the multi-purpose stylesheet. Property set dialog boxes are illustrated in FIGS. 9, 10 and 11. FIG. 9 illustrates a dialog box 90 for applying a property set from a list of available property sets 92. FIG. 10 illustrates a dialog box 150 for editing a property set and FIG. 11 illustrates a dialog box 160 for adding a new property set. A property set is a named set having specific style properties. For example, if ten elements are configured to be 10 pt, italic, and red, it may be useful to create a property set having those style properties. Thus, the property set may be called WarningFont with the associated style properties being 10 pt, italic, and red. To apply the style properties to the ten elements, WarningFont is applied to each element. An advantage of using the property set is that, if it is later desired that all ten elements be 11 pt, italic, and red, the user need only change the font size property for WarningFont, not for each of the ten elements.

The present invention allows the user to edit the source stylesheet code for a given element in context and/or condition for any given output. More specifically, the software allows the user to write stylesheet language specific code such as XSL for a particular output. The custom stylesheet code is stored in the .style file. During future use of the software, the custom stylesheet code may be managed and reused. Further, a library external to the .style file may be provided which allows use of custom stylesheet code in multiple stylesheets. Custom stylesheet code (including, for example, javascript) is added, as at block 135 of FIG. 1. The output results of the multi-purpose stylesheet include formatting characteristics of the multi-purpose stylesheet (unless deleted/modified by the developer) as well as the custom stylesheet code.

Figure 13:
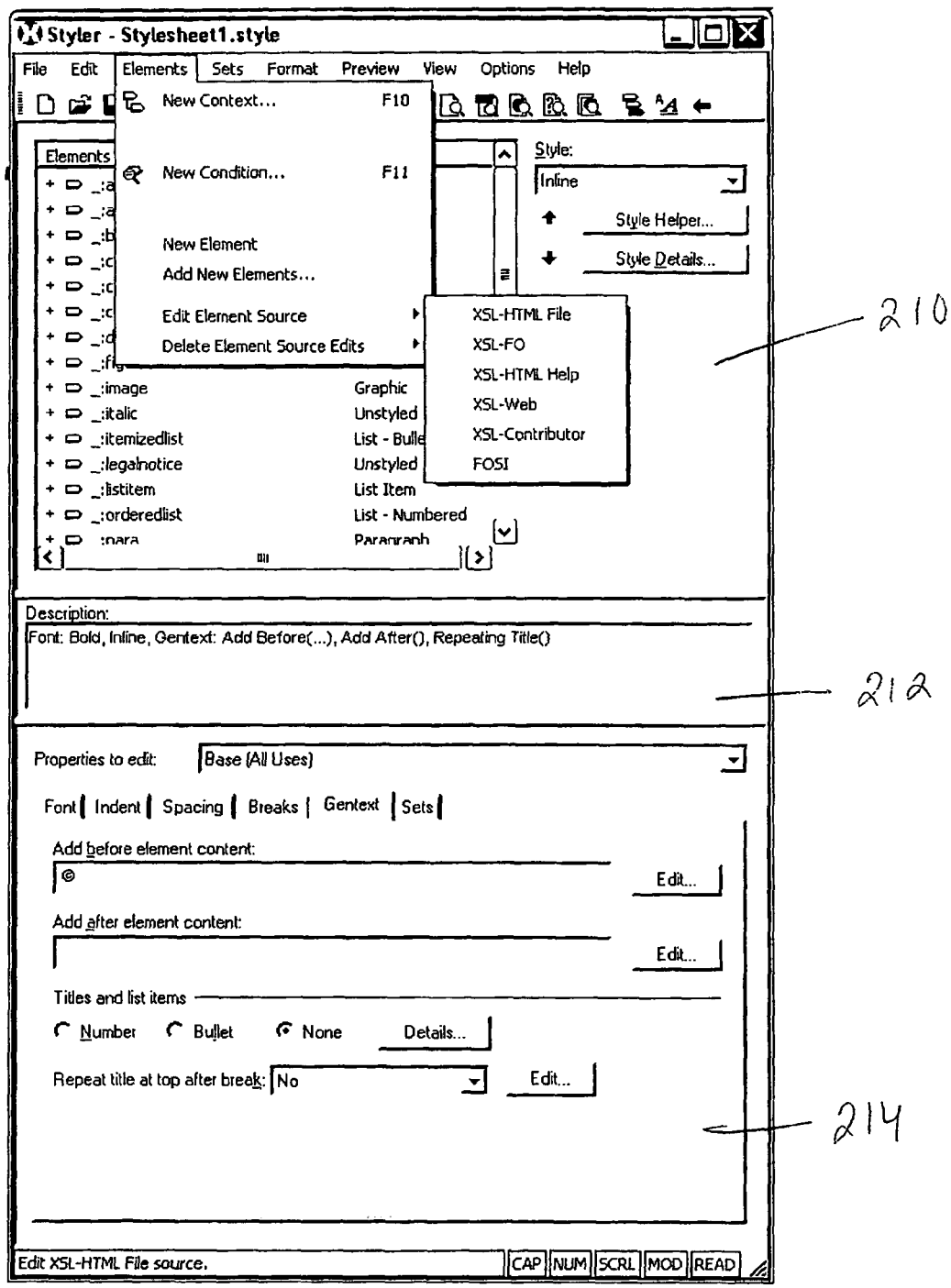
FIG. 13 is a screenshot of a user interface enabling editing of stylesheet source for an element in a context or under a defined condition in accordance with one embodiment of the present invention.

The process of the present invention further enables developer customizations for specific elements/contexts and outputs while maintaining Styler control of all other elements/contexts/outputs. The multi-purpose stylesheet allows extended customization beyond formatting. Editing the element source enables developers to provide additional capabilities while still allowing all other elements and outputs to be modified by the multi-purpose stylesheet. As shown in FIG. 13, to edit the element source, the element source is identified (e.g., XSL-HTML file, XSL-FO, XSL-HTML Help, XSL-Web, XSL-Contributor, or FOSI). An example of editing an XSL-HTML file source is shown in FIG. 14. In FIG. 14, the "copyright" element 170 of an HTML File output is edited.

Figure 18:
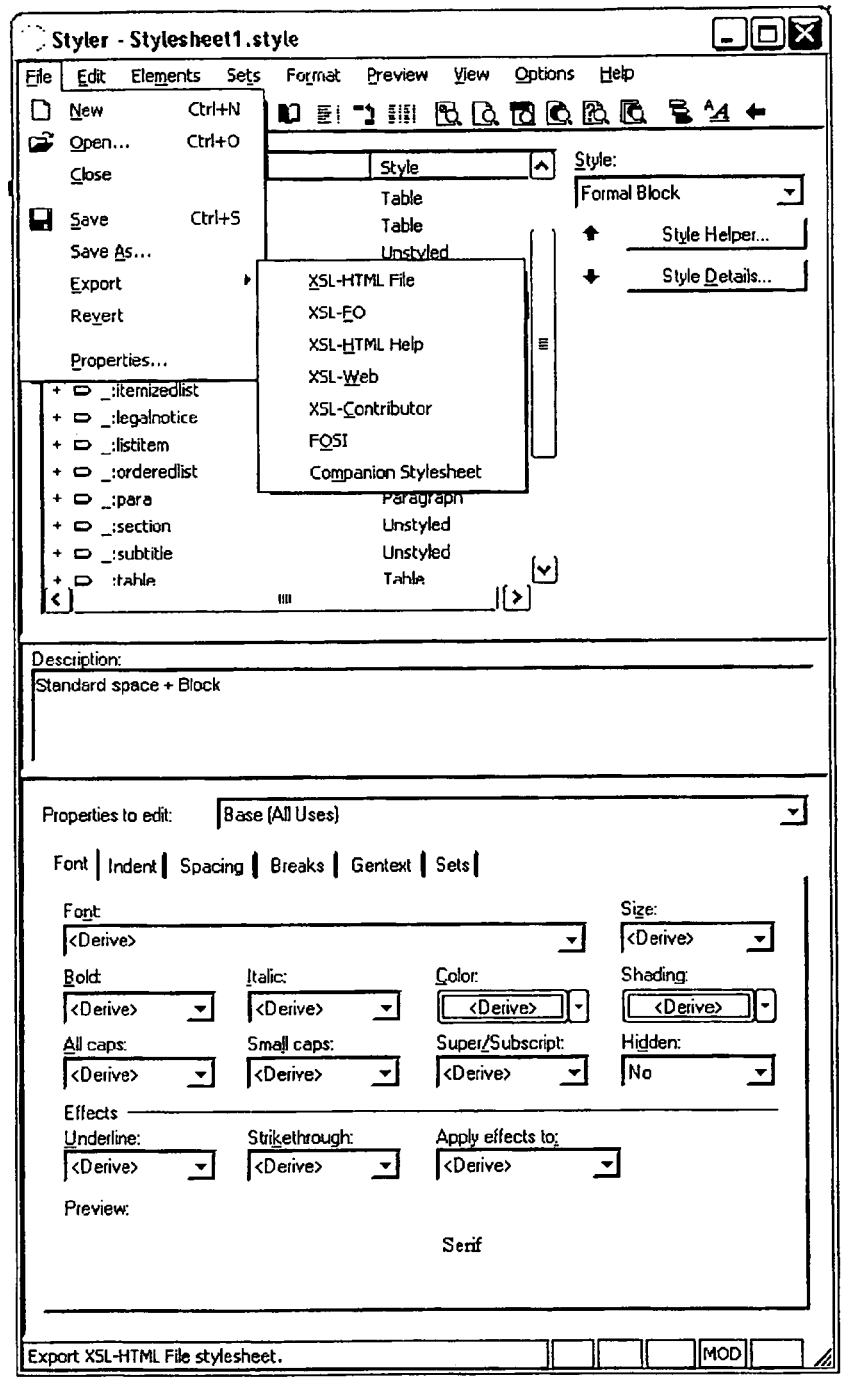
FIG. 18 is a screenshot of user options for exporting to a specific stylesheet language for use in other applications in accordance with one embodiment of the present invention.

FIG. 18 illustrates a dialog box 200 showing user options for exporting to a specific output. Based upon the multi-purpose stylesheet (a single .style file), multiple, target-specific stylesheet languages may be exported. Thus, a single user interface and a single .style file may be used to output, for example, XSLT for a flat HTML file, XSLT for an MS HTML Help file, XSLT for Web output, XSL-FO for Print output, FOSI (DOD standard for SGML formatting) for print and editing in Epic Editor, XSLT for editing in Contributor, .wstyle for editing in Companion (add-in to MS Word 2003), or other outputs. The listed outputs are intended to be illustrative, not limiting.

Finally, the output styling process terminates in end operation 140 such as a save operation.

Although the above operations are listed in a specific order, it should be understood that an embodiment of the present invention may omit certain operations, add others, and/or change the order in which operations are executed. For example, links may be determined and managed prior to applying styles, or user-based formatting rules may be applied before output-based formatting rules. Accordingly, the aforementioned operations are illustrative of the manner of operation of a single embodiment of the present invention, and should not be construed as limiting all embodiments.

Generally, the aforementioned styling procedure is accomplished by the present invention by applying a multi-purpose stylesheet to an input file. The multi-purpose stylesheet contains a variety of formatting rules, conditions, contexts, styles, and so forth that may operate on the input file. The multi-purpose stylesheet contents may be user-specified or may be a default specified by the embodiment.

A user may create, edit, or otherwise modify a multi-purpose stylesheet in accordance with the present invention through the use of a graphical user interface (GUI) associated with an embodiment of the present invention. The GUI Layer may use the Single Document Interface (SDI) for the main window. Normally, an SDI application comprises four visible objects: the main frame window (CFrameWnd), a toolbar (CtoolBar), the view (Cview), and a status bar at the bottom (CstatusBar). In the embodiment shown in FIGS. 2, 12 and 13, Styler's main window base class, StylerFrameWnd, derives from the MFC CframeWnd class. Thus, as shown, Styler comprises three splitter dialog windows. The splitter windows, StylerTreeView 210, StylerDescriptionView 212, and StylerPropView 214 are derived from StylerView which is a subclass of MFC's CformView class.

StylerTreeView 210 displays the top splitter window where the element 22 and styler 26 tree controls are displayed. StylerDescriptionView 212 displays the middle splitter window where the description text is displayed. Typically, the information displayed in StylerDescriptionView 212 is read-only text description information of the currently selected item(s) in the top tree controls. StylerPropView 214 displays the bottom splitter window where the properties are displayed. The StylerPropView 214 manages displaying and modifying of properties associated with the selected item(s) in the top tree controls. Of course, while reference is made to top, middle, and bottom, these are intended as examples to be illustrative and are not intended as limiting.

In use, the user selects an item(s) (e.g., an element, context, or condition) in tree control in the top view, StylerTreeView 210. The tab page currently displayed in the bottom view, StylerPropView 214, shows the resolved values which apply to the selected tree control items. A user may change a value, either by selecting a new value within a dropdown or by hand-entering in an edit box.

When elements are shown, the Properties to edit: dropdown list 216 is visible above the property tabs. When property sets are shown, this control disappears. In the embodiment shown in FIG. 2, the list 216 initially includes <Edit this list>, Base (all outputs), Epic Editor, HTML File, HTML Help, Print/PDF, Web, Word XML, and E3 Editor. Base (all outputs) is generally selected by default. When Base (all outputs) is selected, the user sees the common settings in the property tabs and any property changes made will apply as base settings for all outputs. When a different output is selected, the user still sees the common settings except where there is a different setting for the selected output, in which case, that setting is shown.

When a user first creates a multi-purpose stylesheet in accordance with the present invention, the elements are assigned the style "Unstyled." The first phase of creating the new multi-purpose stylesheet is mapping the elements to "styles" such as "division", "title", "numbered list", "list item", "paragraph", etc. Using these mappings, Styler knows what contexts need to be created for an element, and can also assign default properties. Simply mapping all elements to their correct styles creates a surprisingly effective stylesheet in very little time. Mapping the elements to a "style" may be done by clicking in the editor to select the element to be styled. The user may start at the beginning of the document and work their way through or may skip over some sections and return to it later. Generally, it is useful to style all the ancestors of the section being worked on.

The user may then tweak the formatting properties on an element basis. In this situation, the user does not expand each element and select individual contexts but instead selects the collapsed elements and makes changes that apply to all contexts. The user may then select individual contexts to make select formatting properties specific to the contexts. Further, the user may add conditions to various contexts. The user may preview the result in different outputs and continue making modifications until satisfied with the results.

The user then saves the multi-purpose stylesheet as a .style file. For future use, when the user edits documents of that document type, the .style file saved is used to output the documents as specified in the multi-purpose stylesheet.

The Styler user interface is especially suited for a Windows platform. However, styler multi-purpose stylesheets may be used for editor display or composition on Unix or other suitable platform.

Figure 19:
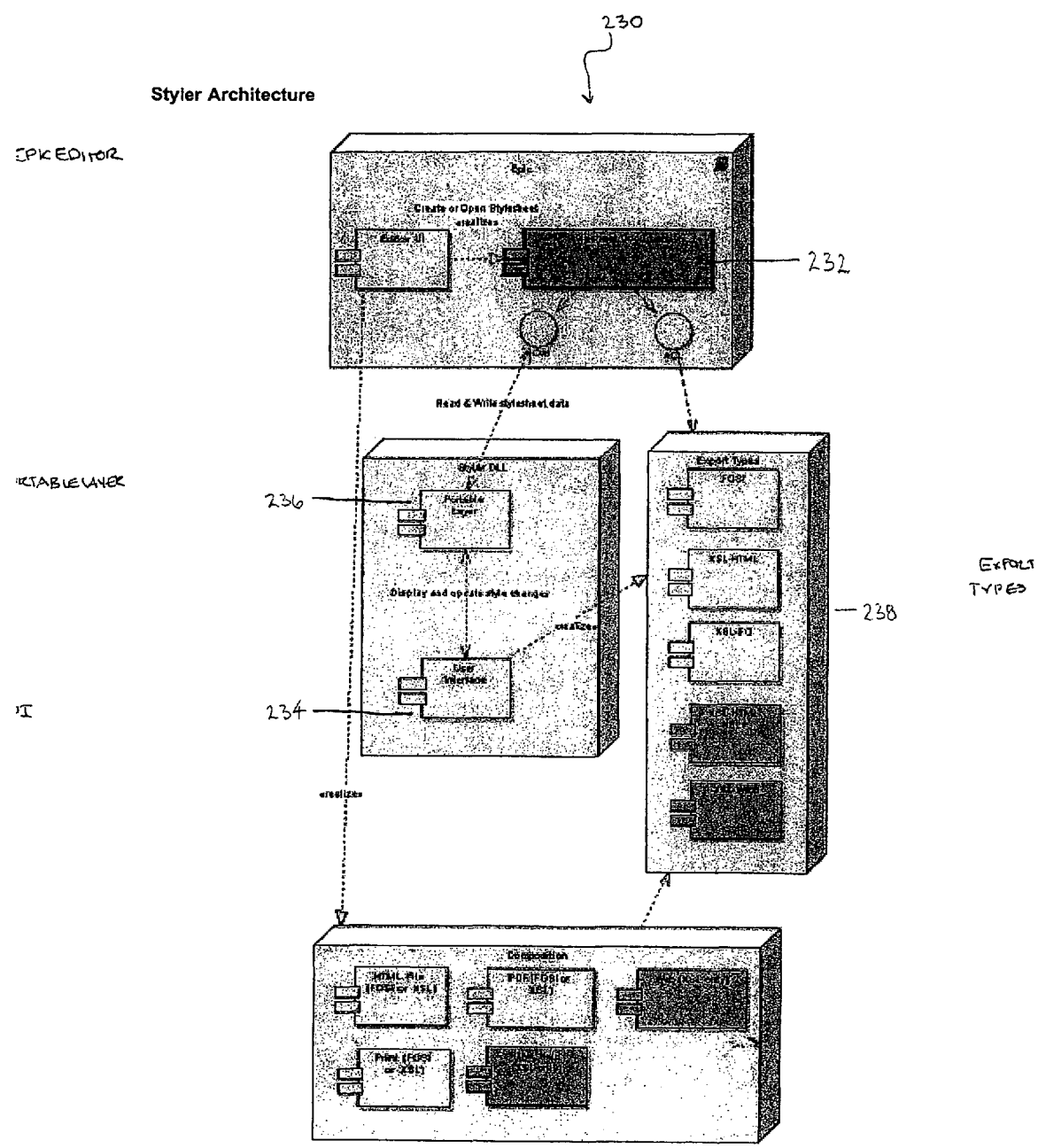
FIG. 19 is a graphical illustration of the architecture of a stylesheet editor in accordance with one embodiment of the present invention.

FIG. 19 illustrates the architecture 230 of an embodiment of the stylesheet editor (Styler) of the present invention. The architecture shown is intended to be illustrative of suitable architecture for the multi-purpose stylesheet editor and is not intended to be limiting. The central repository for the stylesheet data is an XML document 232 (.style). The software design is based around the reading and writing of data to and from the stylesheet document 232. The User Interface (the GUI Layer 234) communicates with the XML document 230 via a set of portable C++ classes (the Portable Layer 236) which serve as an interface to the Document Object Model (DOM) document. The Export operations 238 communicate with the same document 212 using ACL or AOM.

In a Windows system, the Portable Layer 236 and the GUI Layer 234 make up a library. In a Unix system, the Portable Layer 236 makes up the library. Generally, the library is standalone as well as accessible via Epic.

The Styler architecture 230 shown is designed such that the Portable Layer 236 is distinct and separate from the GUI Layer 234. The Styler architecture 230 facilitates support for multiple window systems. The Portable Layer 236 may reside in a standalone DLL (styler.dll) on Windows, as a shared object (styler.so) on Unix, or as otherwise suitable. The source files for the Portable Layer 236 may comprise general purpose C++ classes. FIGS. 20, 21, 22 and 23 illustrate example classes for use with the present invention.

Figure 20:
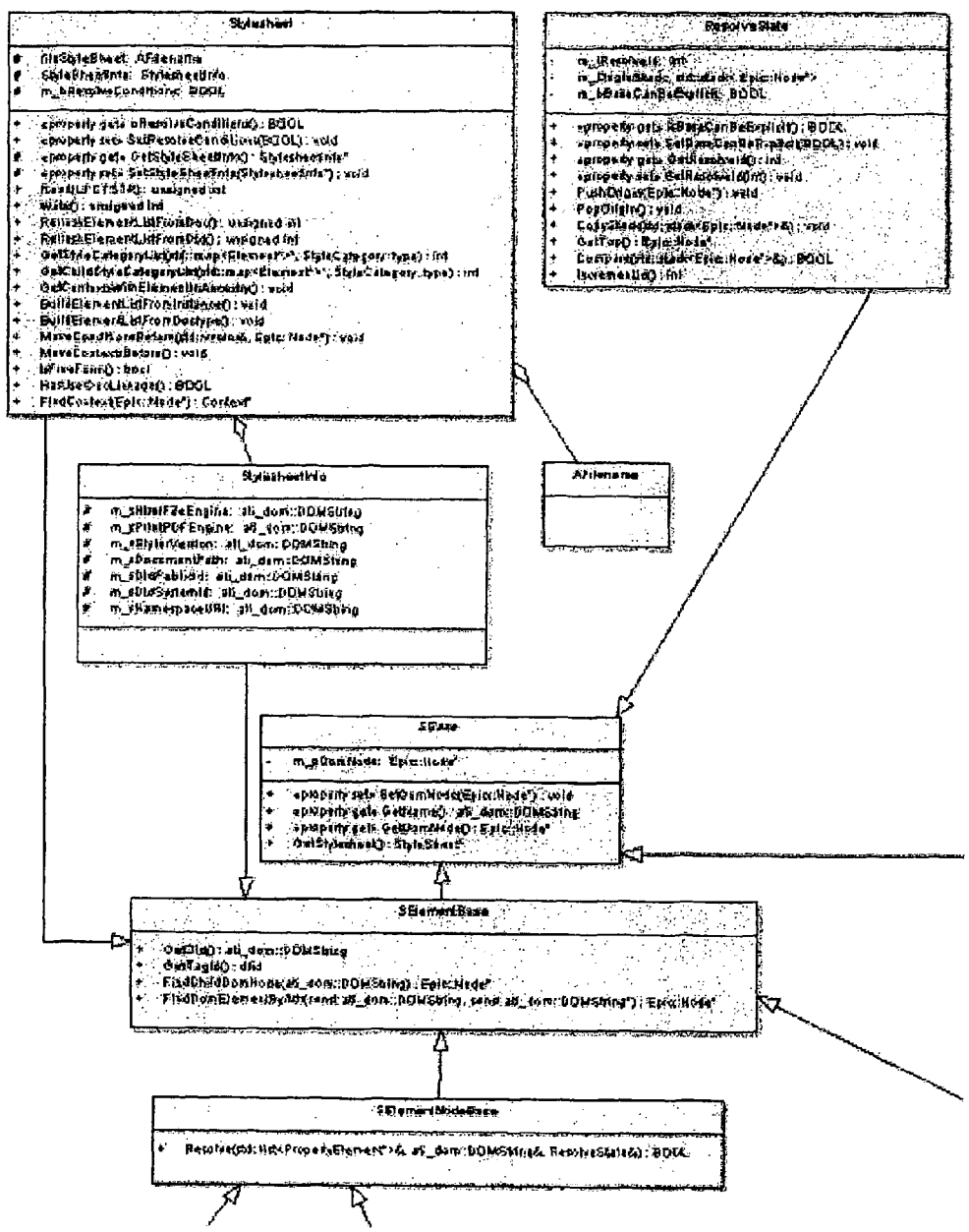
FIG. 20 illustrates Base Classes and Stylesheet Level Classes.

FIG. 20 illustrates Base Classes and Stylesheet Level Classes. Base classes are classes which are generally never intended to be unsubstantiated, although they may not all be abstract classes with any pure virtual functions. The IStylesheet class is an IElementBase subclass which represents the main XML file controlling the Styler application. It exists on the system as an XML file using the Styler doctype. It persists as the doctype element named "styler."

Figure 21:
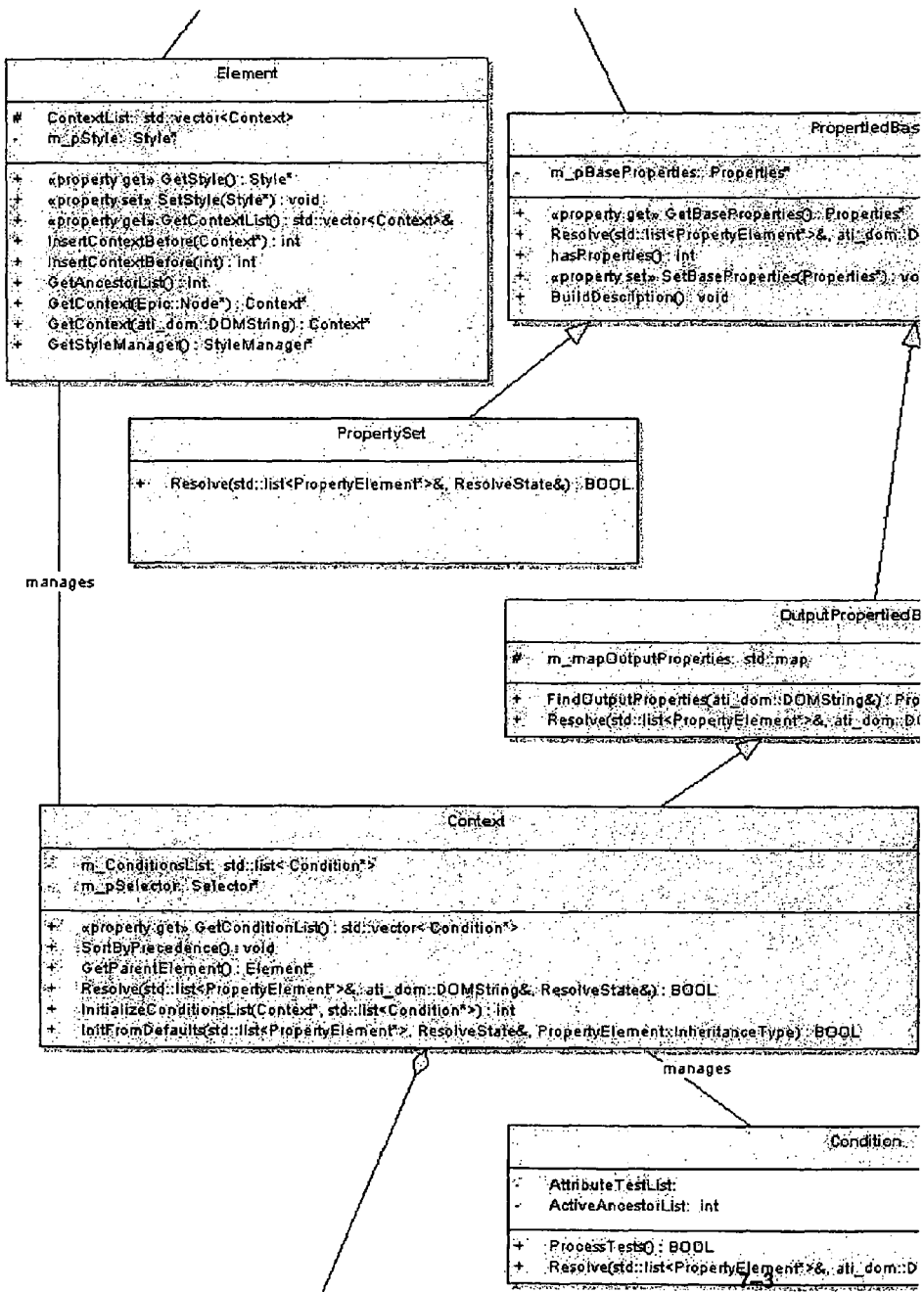
FIG. 21 illustrates IElementNode Subclasses.

FIG. 21 illustrates IElementNode Subclasses. The IElementNodeBase class is derived from IElementBase and represents element objects that are nodes in the GUI layer's tree context. These classes apply to elements, contexts, and conditions (described below). It is an abstract base class and provides fundamental methods such as a Resolve Method that is shared by objects in Styler's main tree control. The IElement class is a subclass of IElementNodeBase. Both the GUI classes and the export classes use the IElement object as the interface between the styler GUI classes and the styler doc (typically the DOM and/or ACL). It persists in the multi-purpose stylesheet as the Element element whose name attribute specifies an element name in the user's document or doctype. It may contain a list of IContext objects.

Figure 22:
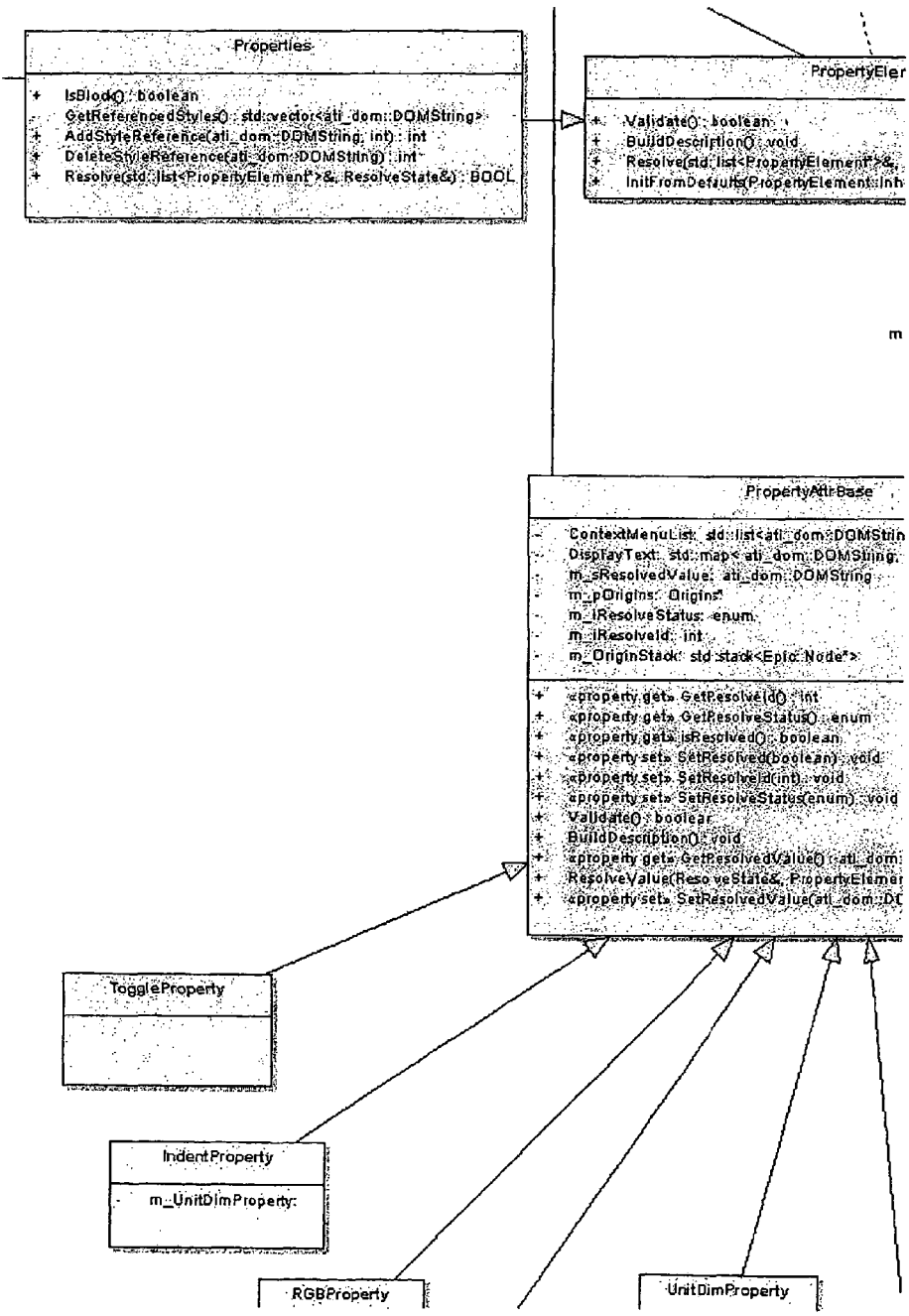
FIG. 22 illustrates Property-related classes.

FIG. 22 illustrates Property-related classes. The IPropertiedBase class is a subclass of IElementNodeBase for objects represented in the Styler DTD as an element which contains BaseProperties. It is an abstract base class for element-based objects and provides fundamental methods and properties specific to elements which contain the BaseProperties element. The IOutputPropertiedBase class is a subclass of IPropertiedBase for objects which are represented in the Styler DTD as an element which has BaseProperties and a list of OutputProperties. It is an abstract base class for element-based objects and provides fundamental methods and properties specific to elements which may contain both the BaseProperties element and the OutputProperties element.

The IContext class is a subclass of IOutputPropertiedBase. Both the GUI classes and the export classes use the Icontextobject as the interface between the styler GUI classes and the styler doc (typically DOM and/or ACL). It persists in the stylesheet as the Context element whose selector attribute specifies an XML context to which the child properties apply. It may contain a list of ICondition objects. It contains two IProperties objects represented in the DTD as BaseProperties and OutputProperties.

The ICondition class is a subclass of IOutputPropertiedBase. Both the GUI classes and the export classes use the ICondition object as the interface between the styler GUI classes and the styler doc (typically the DOM and/or ACL). It persists in the multi-purpose stylesheet as the Condition element whose AttributeTest and XpathTest elements specify an XML condition which further define and refine the contexts to which the child properties apply. It contains two IProperties objects represented in the DTD as BaseProperties and OutputProperties.

Figure 23:
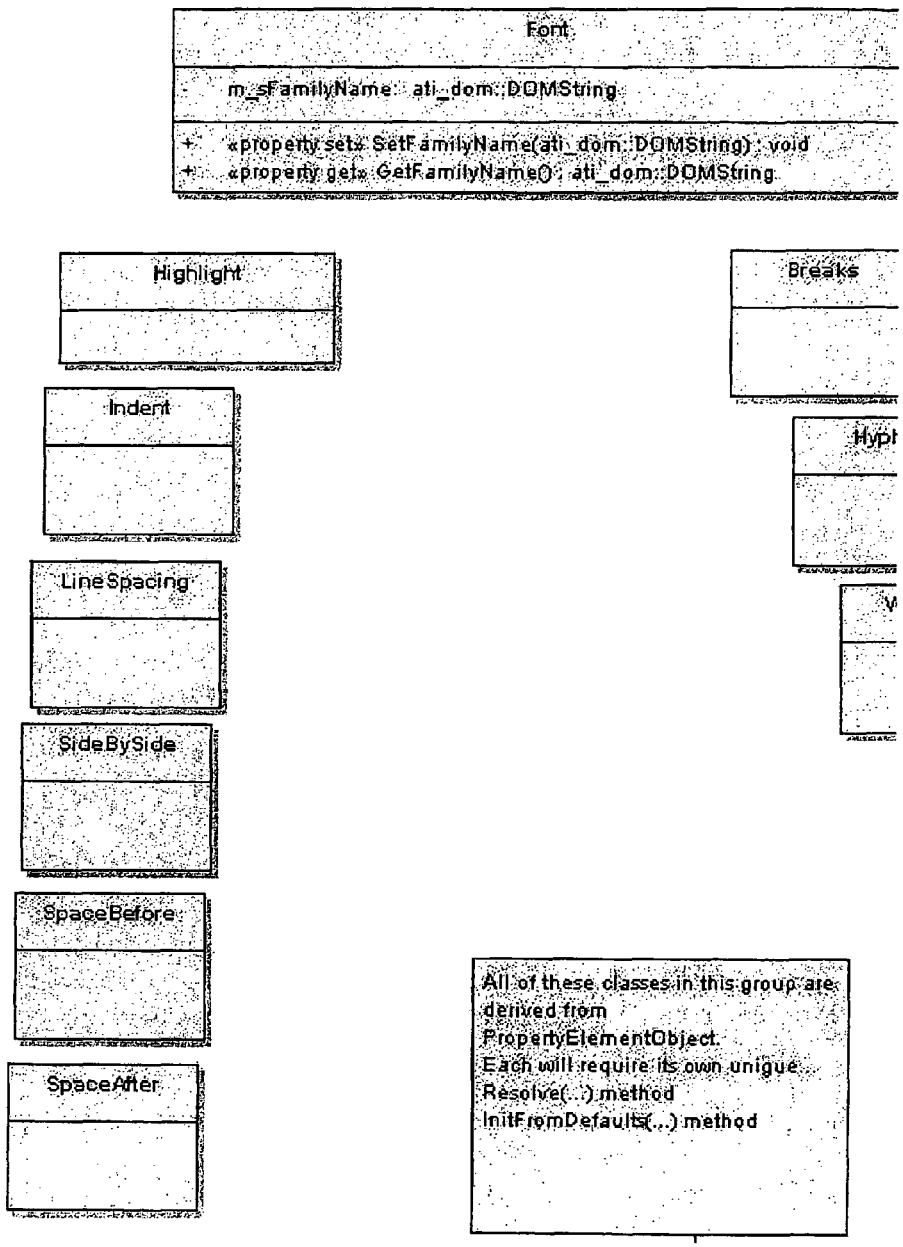
FIG. 23 illustrates IPropertyElementBase subclasses.

FIG. 23 illustrates IPropertyElementBase subclasses. This class represents an abstract base class for single Styler property objects which are DTD elements. As Portable Layer objects they exist as containers for individual attribute lists which are individual style properties. For the GUI, they typically exist simply as containers for attributes which exist in controls.

Users may modify the content of a multi-purpose stylesheet to include custom values, elements, styles, contexts, and conditions.

The Portable Layer 236 communicates with the DOM to retrieve and/or send data for display or manipulation in the GUI layer's various dialogs. The GUI Layer 234 contains a pointer to the Portable Layer's IStylesheet, thereby allowing each view access to the Portable Layer's functions. Direct access to these functions facilitates population and maintenance of data used in controls of the GUI Layer 234. The Styler architecture 230 permits the portable functionality of Styler to function on other platforms besides Windows.

The multi-purpose stylesheet editor, in a specific embodiment, is a Unicode application which supports multiple languages. In a specific embodiment, Styler is compiled as 16-bit (via a _UNICODE compile setting) only. In this embodiment, the Portable Layer 236 uses DOM strings (16-bit) almost exclusively. Also in this embodiment, the GUI Layer 234 uses TCHAR and Cstrings for string operations when required by MFC controls and/or classes. Or course, other settings and/or strings may be used as suitable.

The conversion of an input file to an output file, using Styler, may include, among other options, determining a context-specific, output device-specific, or user-specific format. That is, a multi-purpose stylesheet in accordance with the present invention may alter the format or style of the output file depending on the output source or device, the output file format, the context of data or files contained either within the input or within a hierarchical structure including the input file, or by user accessing the output file or for which the output file is intended.

Formatting properties ("properties") are style settings represented by attributed values on the elements defined in the PropertyElements entity. These elements are children of the BaseProperties and OutputProperties elements. The BaseProperties element is a child of Context, Condition, and PropertySet. The OutputProperties element is a child of Context and Condition.

For contexts and conditions, during the composition process, first the base properties are applied. Then, if there is an OutputProperties element whose output attribute matches the output being composed, the output properties are overlaid.

For any given element of a document, composition follows a process to resolve what set of formatting properties to apply to that element. The composer determines which Context of the current element is the best match based on comparing its selector with where the element occurs in the document. That Context specifies the properties to use for the element. The properties may be specified directly via children of the Context element, or may be derived from PropertySets that are references by the children of the Context element. Additionally, the Contexts may contain Conditions which have Tests and properties. If a Condition's Tests are True, its properties are merged with the Context's. Of course, the Condition's properties may also be specified directly via children of the Condition element, or may be derived from PropertySets that are referenced by the children of the Condition element.

Extensible Markup Language (XML) is a meta-markup language that provides a format for describing structured data. XML is a standard language for storing, viewing, and manipulation Web-based data and provides a uniform method for describing and exchanging structured data in an open, text-based format. XML allows information content to be totally separated from the mechanisms for rendering/displaying that content. Compared to HTML, which is a display-oriented markup language, XML is a general purpose language for representing structured data without including information that describes how to format the data for display.

XML is similar to HTML in that it is a tag-based language. By virtue of its tag-based nature, XML defines a strict tree structure or hierarchy. XML allows the creation of custom tags to describe both proprietary data and business logic. XML "elements" are structural constructs that consist of a start tag, an end or close tag, and the information or content that is contained between the tags. A "start tag" is formatted as "<tagname>" and an "end tag" is formatted as "</tagname>". In an XML document, start and end tags can be nested within other start and end tags. All elements that occur within a particular element must have their start and end tags occur before the end tag of that particular element. This defines a strict tree-like structure. Each element forms a node in this tree, and potentially has "child" or "branch" nodes. The child nodes represent any XML elements that occur between the start and end tags of the "parent" node.

An XML schema is a description of the structure of an XML document. More specifically, an XML schema is a method for specifying constraints on XML documents using an XML-based language. Typically an XML schema is written in XSL Schema Definition (XSD) and support namespaces and data types. Schemas are founded on XML and are, thus, hierarchical. Schemas enable easy creation of an unambiguous specification and determination of the scope over which a comment is meant to apply.

Within each schema, a "dictionary" of element names is defined. The dictionary of element names defined by a schema is referred to as a "namespace." Within an XML document, element names are qualified by namespace identifiers. When qualified by a namespace identifier, a tag name appears in the form "[namespace]:[tagname]". This model enables the same element name to appear in multiple schemas, or namespaces, and for instances of these duplicate element names to appear in the same XML document without colliding. Start tags can declare an arbitrary number of "attributes" which declare "property values" associated with the element being declared. Attributes are declared within the start tag using the form "<[tagname][attribute1][attribute2] . . . [attributeN]>", where an attribute1 through attributeN are declarations of an arbitrary number of tag attributes. Each attribute declaration is of the form "[attributeName]=["attributeValue"]" where each attribute is identified by a unique name followed by an "=" character, followed by the quoted value of the attribute.

The Styler schema comprises several main sections: top level element; definition of parameter entities; StyleSheetInfo; PropertySets; Elements; Styles; PrintedPageSets; TableOfContents; ReferenceFormats; and FosiRsrcDescSource.

StyleSheetInfo is the meta-data for the stylesheet. The Style Sheet Information section of the schema contains stylesheet meta-data. A "Stylesheet Identification Processing Instruction" at the top of each styler file specifies: "title," what is displayed for the style sheet in Arbortext Editor wherever style sheets are listed; and "composition types," the outputs for which the stylesheet can be used. By specifying this information, data is not replicated in the schema. A stylerversion attribute contains the styler version at the time the stylesheet was created, or was last updated. A currentVersion attribute contains the current version of Styler. If the stylerversion is <the currentVersion, styler automatically updates if necessary and changes the stylerversion. MinorVersion and currentMinorVersion attributes keep in-house stylesheets up to date during development. Element sets in the StyleSheetInfo have no effect on what documents or document types the stylesheet may be used for. They enable the Styler User Interface to make editing easier by listing elements and attributes in the UI were appropriate.

PropertySets are building blocks which may be referenced from within the Elements section in order to modularize formatting properties values. A PropertySet is a set of properties that can be referenced from multiple places within the stylesheet (anywhere there is a propertySetReferences attribute). PropertySets allow stylesheets to be modularized. PropertySets can reference other PropertySets.

Formatting properties, or properties for short, are style settings represented by attribute values on the elements defined in the propertyElements entity. These elements are children of the "BaseProperties" and "OutputProperties" elements. The BaseProperties element is a child of "Context", "Condition", and "PropertySet". The OutputProperties element is a child of "Context" and "Condition". For contexts and conditions, during the composition process, first the base properties are applied, and then, if there is an OutputProperties element whose output attribute matches the output being composed, the output properties are overlaid. An individual formatting property can be specified or left unset. This is represented in the stylesheet file by whether or not the attribute representing the property is present.

For any given element of a document, composition follows a process to resolve what set of formatting properties to apply to that element. This process is as follows. The composer determines which Context of the current element is the best match based on comparing its selector with where the element occurs in the document. That Context specifies the properties to use for the element. The properties may be specified directly via children of the Context element, or may be derived from PropertySets that are referenced by the children the Context element. Additionally, the Contexts can contain Conditions which have Tests and properties. If a Condition's Tests are True, its properties are merged with the Context's. Note that the Condition's properties also can be specified directly via children of the Condition element, or may be derived from PropertySets that are referenced by the children of the Condition element. If any properties are still unset at the end of this merging, one of two things happens. 1. If the property is "inheritable", then the property is inherited from, i.e. will be the same as for, the parent element in the document instance; 2. If the property is not inheritable, then it is given a default value by Styler.

Elements contains formatting rules for elements, most commonly including rules for all elements of a given DTD or schema. The Elements section is the core of the stylesheet. The rules for elements may specify output specific formatting properties, and may vary depending on element context, attribute values, etc. Elements are mapped to styles. The element's style determines the available styles, what contexts are created initially for each style, and what properties those contexts have initially.

For some elements, it is desirable to use different properties depending on the context the element occurs in, so Styler associates formatting properties with element "contexts", rather than directly with elements. "Context" is the term used in Styler to specify the combination of an element selector and a set of formatting properties to use for elements that match that selector. The "selector" is specified using an XSL pattern. (Patterns are certain types of XPath expressions.) Only one context for a given instance of an element in a document, the one whose selector best matches the element's context in the document, is processed. If selector is omitted, it implies an XSL pattern that is just the element name.

PrintPageSets defines page layout for print and PDF output.

TablesOfContents is a definition of tables of contents that may be referenced from the Elements section. For each Table of Contents defined by the user, there is a TableOfContents element. This element defines various properties of the Table of Contents by its attributes: Each TableOfContents element has five TocLevelIndent children, one for each TOC level. Those elements control indenting and number positioning of table of contents entries.

ReferenceFormats includes global definitions of formats used for cross-reference and references to divisions from headers and footers.

FosiRsrcDescSource contains optional FOSI rsrcdesc source markup that may be merged into an exported FOSI.

An exemplary schema for the present invention is attached as Appendix A.

Although the present invention has been described with reference to preferred embodiments, persons skilled in the art will recognize that changes may be made in form and detail without departing from the spirit and scope of the invention.

We claim:

1. A system including at least one processor for defining specifications for and creating a single multi-purpose stylesheet from a single user interface, the single multi-purpose stylesheet being capable of designing and outputting content in multiple output media formats, the multi-purpose stylesheet being stored on a computer-readable storage medium and comprising:

instructions within the single multi-purpose stylesheet identifying information to be output to at least one of several device types, user types, context types, or condition types; and instructions within the single multi-purpose stylesheet comprising one or more formatting rules defining at least one format for at least a portion of the information for each of the multiple output media formats, the at least one format associated with at least one of the device types, the user types, the context types, or the condition types whereby, when the information is output in a particular output media format, the defined format for the selected output will be applied;

wherein the single stylesheet is created through the single user interface configured to allow a user to select one or more formatting rules for the at least one format for each of the multiple output media formats, wherein the instructions comprising one more formatting rules defining a format for at least a portion of the identified information to be output define an addition of automatically generated text in conjunction with identified information for each of the multiple output media formats in which the information is output, and wherein the single user interface allows the user to select the one or more formatting rules for the at least one format for each of the multiple output media formats without the use of programming language semantics.

2. The system of claim 1, wherein the instructions within the stylesheet identifying information to be output comprise instructions identifying elements of an input file to be output.

3. The system of claim 2, further comprising instructions to identify type of element.

4. The system of claim 3, wherein the instructions include tags to identify the type of element.

5. The system of claim 1, further comprising instructions to identify a location of the information identified to be output.

6. The system of claim 1, wherein the instructions that define a format for at least a portion of the identified information to be output include at least one style archetype for each of the multiple output media formats in which the information is output.

7. The system of claim 1, wherein the instructions comprising one more formatting rules defining a format for at least a portion of the identified information to be output define a font for the identified information for each of the multiple output media formats in which the information is output.

8. The system of claim 1, wherein the instructions comprising one more formatting rules defining a format for at least a portion of the identified information to be output define indent properties for the identified information for each of the multiple output media formats in which the information is output.

9. The system of claim 1, wherein the instructions comprising one more formatting rules defining a format for at least a portion of the identified information to be output define spacing properties for the identified information for each of the multiple output media formats in which the information is output.

10. The system of claim 1, wherein the instructions comprising one more formatting rules defining a format for at least a portion of the identified information to be output define break properties for the identified information for each of the multiple output media formats in which the information is output.

11. The system of claim 1, wherein at least one of the multiple output media formats is print.

12. The system of claim 1, wherein at least one of the multiple output media formats is portable document format.

13. The system of claim 1, wherein at least one of the multiple output media formats is Wireless Markup Language.

14. The system of claim 1, wherein at least one of the multiple output media formats is hypertext markup language.

15. The system of claim 1, wherein at least one of the multiple output media formats is PostScript.

16. The system of claim 1, wherein at least one of the multiple output media formats is a compiled format.

17. The system of claim 1, wherein the instructions convert an input content to the multiple output media formats and wherein the input content has a media format different from at least one of the multiple output media formats.

18. The system of claim 1, wherein the single stylesheet is a non-composite stylesheet.

19. The system of claim 1, wherein the instructions within the single stylesheet identifying information to be output comprise instructions to recursively parse the information for one or more patterns.

20. The system of claim 1, wherein the instructions comprising one more formatting rules defining a format for at least a portion of the identified information to be output define a context for the identified information.

21. The system of claim 1, wherein the instructions comprising one more formatting rules defining a format for at least a portion of the identified information to be output define a condition for the identified information.

22. The system of claim 1, wherein the instructions comprising one more formatting rules defining a format for at least a portion of the identified information to be output further comprise instructions to resolve a conflict between two or more contexts or between two or more conditions.

23. The system of claim 1, wherein the instructions comprising one more formatting rules defining a format for at least a portion of the identified information to be output define a baseline format each of the multiple output media formats in which the information is output.

24. A system including at least one processor for defining specifications for and creating a single multi-purpose stylesheet from a single user interface, the single multi-purpose stylesheet being capable of designing and outputting content in multiple output media formats, the single multi-purpose stylesheet being stored on a computer-readable storage medium and comprising:

instructions within the single multi-purpose stylesheet identifying information to be output to at least one of several device types, user types, context types, or condition types; and instructions within the single multi-purpose stylesheet comprising one or more formatting rules defining at least one format for at least a portion of the information for each of the multiple output media formats, the at least one format associated with at least one of the device types, the user types, the context types, or the condition types whereby, when the information is output in a particular output media format, the defined format for the selected output will be applied, wherein the instructions comprising one more formatting rules defining a format for at least a portion of the identified information to be output define an addition of automatically generated text in conjunction with identified information for each of the multiple output media formats in which the information is output, and wherein the single user interface allows the user to select the one or more formatting rules for the at least one format for each of the multiple output media formats without the use of programming language semantics.

* * * * *

UNITED STATES PATENT AND TRADEMARK OFFICE
CERTIFICATE OF CORRECTION

PATENT NO. : 8,484,553 B2  
APPLICATION NO. : 10/839320  
DATED : July 9, 2013  
INVENTOR(S) : John J. Lloyd Page 1 of 1

It is certified that error appears in the above-identified patent and that said Letters Patent is hereby corrected as shown below:

TITLE PAGE

| Item (75) Inventors | Should Read |
|---|---|
| "David L. White, Pickney, MI" | -- David L. White, Pinckney, MI -- |

SPECIFICATION

| Column | Line | | Should Read |
|---|---|---|---|
| 9 | 30 | "in operation 10, the invention" | -- in operation 110, the invention -- |
| 16 | 64 | "StyleSheetInfo is the meta-data" | -- StyleSheetInfo is the meta-data -- |
| 17 | 4-5 | "A stylerversion attribute" | -- A stylerVersion attribute -- |
| 17 | 7-8 | "If the stylerversion is" | -- If the stylerVersion is -- |
| 17 | 9 | "changes the stylerversion." | -- changes the stylerVersion. -- |

Signed and Sealed this  
Seventeenth Day of September, 2013

Teresa Stanek Rea  
*Deputy Director of the United States Patent and Trademark Office*